(12) United States Patent
Nakahara et al.

(10) Patent No.: US 7,984,508 B2
(45) Date of Patent: Jul. 19, 2011

(54) CONTENTS USING DEVICE, AND CONTENTS USING METHOD

(75) Inventors: Tohru Nakahara, Osaka (JP); Masaki Igarashi, Osaka (JP); Ryuichi Okamoto, Osaka (JP); Kouji Miura, Osaka (JP); Katsumi Tokuda, Osaka (JP)

(73) Assignee: Panasonic Corporation, Osaka (JP)

( * ) Notice: Subject to any disclaimer, the term of this patent is extended or adjusted under 35 U.S.C. 154(b) by 765 days.

(21) Appl. No.: 11/666,617

(22) PCT Filed: Oct. 21, 2005

(86) PCT No.: PCT/JP2005/019428
§ 371 (c)(1),
(2), (4) Date: Feb. 28, 2008

(87) PCT Pub. No.: WO2006/049023
PCT Pub. Date: May 11, 2006

(65) Prior Publication Data
US 2008/0263624 A1  Oct. 23, 2008

(30) Foreign Application Priority Data
Nov. 1, 2004 (JP) .................................. 2004-317860

(51) Int. Cl.
*G06F 12/14* (2006.01)
(52) U.S. Cl. ............................................. 726/27; 726/1
(58) Field of Classification Search ................ 726/1, 26, 726/27
See application file for complete search history.

(56) References Cited

U.S. PATENT DOCUMENTS

| 2002/0112171 | A1* | 8/2002 | Ginter et al. ................... 713/185 |
| 2003/0014655 | A1* | 1/2003 | England et al. ................ 713/200 |
| 2003/0028622 | A1* | 2/2003 | Inoue et al. .................... 709/219 |
| 2003/0104803 | A1  | 6/2003 | Adachi et al. |
| 2004/0158731 | A1* | 8/2004 | Narin et al. .................... 713/200 |

FOREIGN PATENT DOCUMENTS

| JP | 2002-8309 | 1/2002 |
| JP | 2003-167787 | 6/2003 |
| JP | 2005-524163 | 8/2005 |
| WO | 03/092264 | 11/2003 |

\* cited by examiner

*Primary Examiner* — Ellen Tran
(74) *Attorney, Agent, or Firm* — Wenderoth, Lind & Ponack, L.L.P.

(57) ABSTRACT

A contents using device (or a terminal device) 300 is composed of: a license processing unit 305 which judges, on the basis of a usage rule of a license, whether or not the content is available; a content reproduction unit 304 which uses the content judged by the terminal device 300 to be available; a restriction unit (or a content reproduction unit 304) which restricts the license corresponding to the contents from being used by another source by reason that the license is currently in use, for a time period between a start and a normal end of the content usage by the content reproduction unit 304; an event detection unit 307 which detects a predetermined event that occurs between the start and the normal end of the content usage and that forcefully aborts the content usage; a restriction-relaxation necessity judgment unit (or a recovery/penalty judgment unit) 309 which judges whether or not the predetermined event is against an intention of a user; and a restriction relaxation unit (or a license recovery unit) 306 which relaxes the restriction on the content usage when the recovery/penalty judgment unit 309 judges that the predetermined event is against the intention of the user.

30 Claims, 19 Drawing Sheets

FIG. 3

| USER IDENTIFIER | TERMINAL IDENTIFIER |
|---|---|
| USER-ID-0001 | TERMINAL-ID-0001 |
| USER-ID-0002 | TERMINAL-ID-1001<br>TERMINAL-ID-1002 |
| USER-ID-0003 | TERMINAL-ID-3333 |
| USER-ID-0004 | TERMINAL-ID-4444 |
| ... | ... |

| USER IDENTIFIER | CONTENT IDENTIFIER | VALID PERIOD | ALLOWED NUMBER OF USAGES | ALLOWED USAGE PERIOD |
|---|---|---|---|---|
| USER-ID-0001 | CONTENT-ID-0001 | ~2003/1/30 | 10 | — |
| USER-ID-0002 | CONTENT-ID-0002 | 2002/12/1~ | — | 10 MINUTES |
| USER-ID-0002 | CONTENT-ID-0003 | UNLIMITED | 1 | — |
| USER-ID-0003 | CONTENT-ID-0004 | 2002/11/24~2002/12/20 | UNLIMITED | — |
| ... | ... | ... | ... | ... |

| LICENSE IDENTIFIER | LICENSE | LOCK FLAG |
|---|---|---|
| LICENSE-ID-0001 | LICENSE-0001 | 0 |
| LICENSE-ID-0002 | LICENSE-0001 | 0 |
| LICENSE-ID-0003 | LICENSE-0003 | 0 |
| LICENSE-ID-0004 | LICENSE-0004 | 0 |
| ... | ... | ... |

| EVENT IDENTIFIER | NUMBER OF RECOVERIES |
|---|---|
| 1 | 2 |
| 2 | 0 |
| ... | ... |

| EVENT IDENTIFIER D1101 | EVENT DETAIL D1102 | DETECTION METHOD D1103 | THRESHOLD VALUE D1104 | RECOVERY DETAIL D1105 | PENALTY DETAIL D1106 |
|---|---|---|---|---|---|
| 1 | POWER DOWN DURING CONTENT REPRODUCTION | LOCKING OF LICENSE WHOSE CONTENT IS NOT BEING REPRODUCED | 5 TIMES PER DAY | UN-LOCKING | CURRENT LICENSE NOT AVAILABLE |
| 2 | CARD REMOVAL DURING CONTENT REPRODUCTION | CARD INSERTION/REMOVAL MONITORING MEANS<br>POWER SUPPLY MONITORING MEANS | 10 TIMES | UN-LOCKING | CURRENT TERMINAL NOT AVAILABLE |
| ⋮ | ⋮ | ⋮ | ⋮ | ⋮ | ⋮ |

CONTENTS USING DEVICE, AND CONTENTS USING METHOD

TECHNICAL FIELD

The present invention relates to a contents using device that uses a copyrighted content and to a contents using method.

BACKGROUND ART

In recent years, systems which distribute digital copyrighted works, such as music, images, and games, through the Internet or digital broadcasting have been developed. Some of them have entered a commercial stage. In connection with the content distribution, methods of controlling content usages are also considered in order to limit the number of reproduction times, transfers, and duplicates of the distributed content from the viewpoint of copyright protection.

Conventionally, a server distributes information that includes a usage rule and a content key required when using the content (this information is referred to as the "license" hereafter). With the license distributed from the server, a home terminal device is modeled to use the content so as to perform reproduction and so forth.

As the usage rule, an allowed number of content usages and an allowed cumulative time period of a content usage are set, for example. In this case, the usage rule needs to be updated in accordance with the amount that the terminal device has been using the content.

For example, Patent Reference 1 describes a contents using device which allows a content usage in the case where the number of usages is other than 0 when a terminal device starts to use content, and then subtracts one from the number of usages at the end of the content usage.

Patent Reference 1: Japanese Laid-Open Patent Application No. 2002-008309

DISCLOSURE OF INVENTION

Problems that Invention is to Solve

The conventional contents using device, however, has a problem as follows.

According to the conventional technology, in the case of an event, such as a power down of a user terminal, that prevents detection of an end or an interruption of usage, no subtraction is performed on the usage rule of the license regardless of whether or not the content have been used.

For this reason, when the user intentionally causes a power down during the content usage, no subtraction is performed on the usage rule although the content has been used. This makes possible to use the right fraudulently.

In order to prevent such a fraudulent act, a method to subtract a predetermined amount from the usage rule at the start of usage, which is opposite to the conventional technology, can be suggested. Using this method, however, in the case of the event that prevents the detection of the end or the interruption of usage, the subtraction is performed on the usage rule regardless of whether or not the content has been used.

In this way, even when an accidental power down occurs immediately after the start of a content reproduction, the predetermined amount ends up being subtracted from the usage rule although the content has hardly been used. Consequently, the right of the user cannot be protected. For example, consider a case where ten minutes are subtracted from the allowed time period of usage at the start of usage and a corresponding allowed time period of usage (obtained by subtracting the consumed time period from ten minutes) is added at the end of usage. In this case, when the power down occurs two minutes after the usage is started, nothing would be added although eight minutes should be actually added. This means that the user loses eight minutes of the allowed time period of usage.

The present invention was conceived in order to solve such a conventional problem, and has an object of providing a contents using device which prevents a fraudulent use of a right while protecting a right of an authorized user in the case of an event such as a power down that prevents detection of an end of usage.

Means to Solve the Problems

In order to achieve the stated object, the contents using device according to the present invention is a contents using device which uses a content with a license including a usage rule, the contents using device being composed of: a license processing unit operable to judge, on the basis of the usage rule of the license, whether or not the content is available; a content using unit operable to use the content judged by the license processing unit to be available; a restriction unit operable to restrict the license corresponding to the content from being used by another source, by reason that the license is currently in use, for a time period between a start and a normal end of the content usage by the content using unit; an event detection unit operable to detect a predetermined event that occurs between the start and the normal end of the content usage by the content using unit and that forcefully aborts the content usage; a restriction-relaxation necessity judgment unit operable to judge whether or not the predetermined event is against an intention of a user; and a restriction relaxation unit operable to relax a restriction on the content usage when the restriction-relaxation necessity judgment unit judges that the predetermined event is against the intention of the user.

It should be noted that the present invention can be realized not only as such a contents using device, but also as: a contents using method which is composed of steps corresponding to the characteristic units provided for the contents using device; and a program that causes a computer to execute these steps. It should be understood that such a program can be distributed via a recording medium such as a CD-ROM or a transmission medium such as the Internet.

Effects of the Invention

As can be obvious from the above explanation, the present invention can recover from a disadvantage caused to the user by the occurrence of a predetermined event, such as a power down, and can impose a penalty on the user when the occurrence of the predetermined event exceeds a specified rule. In this way, the present invention can protect the right of the authorized user as well as preventing the fraudulent use of the right.

Accordingly, the present invention allows the protection, which has been one-sided in favor of a provider, to be directed toward the user. On account of this, the practical value of the present invention is extremely high these days, where copyright protection has become widespread.

BRIEF DESCRIPTION OF DRAWINGS

FIG. 3 is a diagram showing a table structure of a user information storage unit 111 according to the embodiment of the present invention.

FIG. 4 is a diagram showing a table structure of a usage rule storage unit 112 according to the embodiment of the present invention.

FIG. 9 is a diagram showing a table structure of a license storage unit 312 according to the embodiment of the present invention.

FIG. 10 is a diagram showing a table structure of a recovery/penalty history storage unit 313 according to the embodiment of the present invention.

FIG. 11 is a diagram showing a table structure of a recovery/penalty history storage unit 314 according to the embodiment of the present invention.

Figure 1:
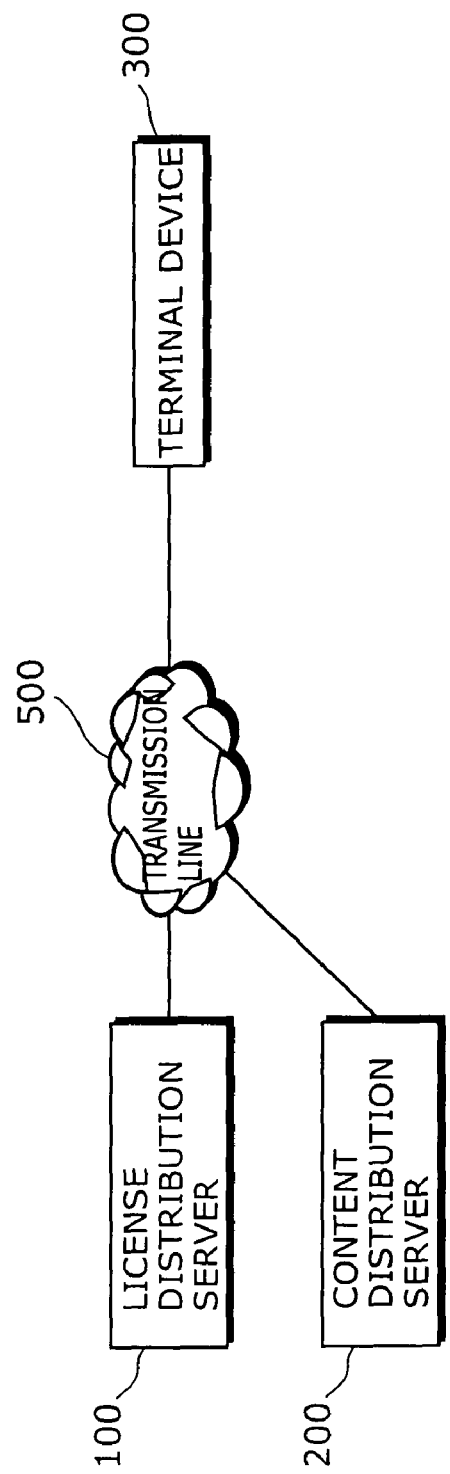
FIG. 1 is a diagram showing an overall rough construction of a contents using system according to an embodiment of the present invention.

NUMERICAL REFERENCES 100 license distribution server
101, 201, 301 communication unit
102 license generation/sending unit
111 user information storage unit
112 usage rule storage unit
113 content key storage unit
200 content distribution server
202 content acquisition/sending unit
211 content storage unit
300 terminal device
301 communication unit
302 content acquisition unit
303 license acquisition unit
304 content reproduction unit
305 license processing unit
306 license recovery unit
307 event detection unit
308 penalty processing unit
309 recovery/penalty judgment unit
311 content storage unit
312 license storage unit
313 recovery/penalty history storage unit
314 recovery/penalty information storage unit
500 transmission line

BEST MODE FOR CARRYING OUT THE INVENTION

The following is a detailed explanation of the embodiment of the present invention, with reference to the drawings.

FIG. 1 is a diagram showing an overall rough construction of a contents using system according to the embodiment of the present invention.

This contents using system reproduces a content using a terminal device 300 in accordance with a usage rule included in a license. The system is composed of: a license distribution server 100 for generating and distributing a license; a content distribution server 200 for holding and distributing a content; a terminal device 300 for acquiring the content and the license and for using the content; a transmission line 500 for interconnecting these.

The license distribution server 100 is a server device which has a function of connecting to the transmission line 500, holds user information, usage rule information, etc., and generates and sends the license on the basis of a request from the terminal device 300. The license distribution server 100 is realized by a workstation or the like.

The content distribution server 200 is a server device which has a function of connecting to the transmission line 500, holds content information, and sends the content on the basis of a request from the terminal device 300. The content distribution server 200 is realized by a workstation or the like.

The terminal device 300 has a function of connecting to the transmission line 500, holds the content and the license, and uses the content, such as outputting the content to a monitor or the like, writing the content into a recording medium, or transferring the content to another terminal device 300. To be more specific, the terminal device 300 is a data reproduction device, a recording device, or a device that combines these. Examples of the data reproduction device and the recording device include an STB (Set Top Box) for receiving a digital broadcast, a digital TV, a DVD (Digital Versatile Disc) recorder, an HDD (Hard Disk Drive) recorder, a PC (Personal Computer), a PDA (Personal Digital Assistance), and a mobile phone.

The transmission line 500 is a network for interconnecting the license distribution server 100, the content distribution server 200, and the terminal device 300. To be more specific, the transmission line 500 is constructed from a cable network such as Ethernet (a registered trademark), a wireless network such as a wireless LAN, or a network that combines these.

In the present embodiment, detailed explanations are given about a process performed by the terminal device 300 in this contents using system to acquire the license and the content and to start and end the reproduction of the content, and about a process performed by the terminal device 300 in the case of a predetermined event such as a power down.

Next, a detailed construction of the license distribution server 100 is explained.

Figure 2:
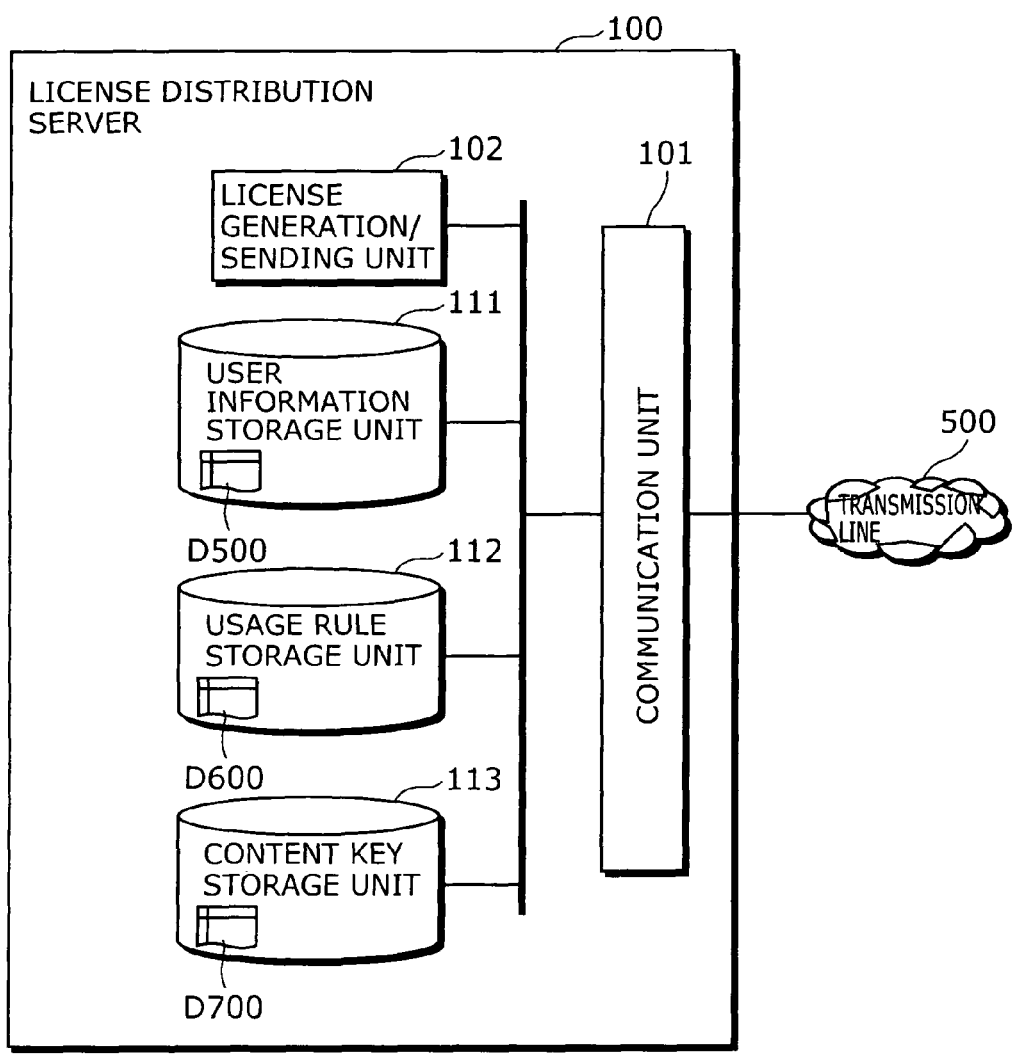
FIG. 2 is a functional block diagram showing a construction of a license distribution server 100 according to the embodiment of the present invention.

FIG. 2 is a functional block diagram showing the detailed construction of the license distribution server 100 shown in FIG. 1.

The license distribution server 100 is composed of: a user information storage unit 111 for storing user information; a usage rule storage unit 112 for storing a usage rule; a content key storage unit 113 for storing a content key; a communication unit 101 for connecting to the transmission line 500 to communicate with the terminal device 300; and a license generation/sending unit 102 for generating and sending the license using the usage rule and the content key on the basis of a request from the terminal device 300.

The user information storage unit 111 is a database that has a user information management table for managing information about the user and that is used for relating the terminal device 300 accessing the license distribution server 100 to the user having the usage rule of the content managed by the usage rule storage unit 112. To be more specific, the user information storage unit 111 holds a user information management table D500 shown in FIG. 3. In the user information management table D500, a user identifier D501 and a terminal identifier D502 are managed in relation to each other as shown in FIG. 3. Here, the user identifier refers to information for uniquely identifying the user in the contents using system. The terminal identifier refers to information for uniquely identifying the terminal device 300 in the contents using system.

FIG. 3 shows that the user whose user identifier D501 is "USER-ID-0001" has the terminal device 300 whose terminal identifier is "TERMINAL-ID-0001", for example. Moreover, it is shown that the user whose user identifier D501 is "USER-ID-0002" has two terminal devices 300 whose respective terminal identifiers D502 are "TERMINAL-ID-1001" and "TERMINAL-ID-1002". It is also shown here that the user whose user identifier D501 is "USER-ID-0002" can access the license distribution server 100 from either of these terminal devices 300.

It should be noted that a data entry to the user information storage unit 111 is performed by the user when signing up for a membership to obtain service offered by a service provider that runs content distribution service. For this membership sign-up process, the user may sign up online on a membership sign-up screen by connecting, via the transmission line 500, to a Web site of the provider that offers the content distribution service, or may sign up offline by, for example, using a postcard for membership sign-up.

In the membership sign-up process, the service provider first assigns the user identifier D501 to the user. After this, the terminal identifier D502 of the terminal device 300 owned by the user is notified to the service provider online or offline. Accordingly, the user identifier D501 and the terminal identifier D502 are entered, in relation to each other, to the user information management table D500 of the user information storage unit 111. As a result of the membership sign-up process performed as described above, the user information management table D500 of the user information storage unit 111 is built.

The usage rule storage unit 112 is a database that manages a usage rule of a content for each user, and that is used for judging whether or not the usage rule owned by the user is allowed to be issued in response to a license distribution request from the terminal device 300 and for generating the usage rule when allowed to be issued.

To be more specific, the usage rule storage unit 112 holds a usage rule management table 600. As shown in FIG. 4, the usage rule management table 600 manages the following in relation to each other: a user identifier D601 showing an owner of the usage rule; a content identifier D602 of a content which is licensed to be used under the usage rule; a valid period D603 showing dates of commencement and expiration, during which the content indicated by the content identifier D602 can be used; an allowed number of usages D604 showing an allowed number of times the content indicated by the content identifier D602 can be used; and an allowed usage period D605 showing an allowed cumulative time period for which the content indicated by the content identifier D602 can be used. Here, the content identifier refers to information for uniquely identifying the content in the contents using system.

For example, it is shown that the user whose user identifier D601 is "USER-ID-0001" is licensed to use the content whose content identifier D602 is "CONTENT-ID-0001". Moreover, it is shown that the user has a usage rule regarding the content, under which: the valid period D603 is "until 2003/1/30"; the allowed number of usages D604 is ten times; and the allowed usage period D605 is not set.

It should be noted that a data entry to the usage rule storage unit 112 is performed by the service provider that runs the content distribution service when the user purchases the right to use the content. For this purchase process, the user may purchase the right online on a content purchase screen by connecting, via the transmission line 500, to a Web site of the service provider, or may purchase offline by, for example, using a postcard for the purchase.

In the purchase process, the user first designates the content identifier D602 of the content that the user wishes to purchase and then performs the purchase process after verifying the usage rule. The user identifier D601 of the user who performed the purchase process, the content identifier D602, and the usage rule are stored, in relation to each other, into the usage rule management table D600 of the usage rule storage unit 112. As a result of the purchase process performed as described above, the usage rule management table D600 of the usage rule storage unit 112 is built.

The content key storage unit 113 is a database that manages a content key used for decoding an encrypted content. When a license is to be created in response to a license acquisition request from the terminal device 300, this database is used for acquiring a content key corresponding to a content identifier included in the license acquisition request.

Figure 5:
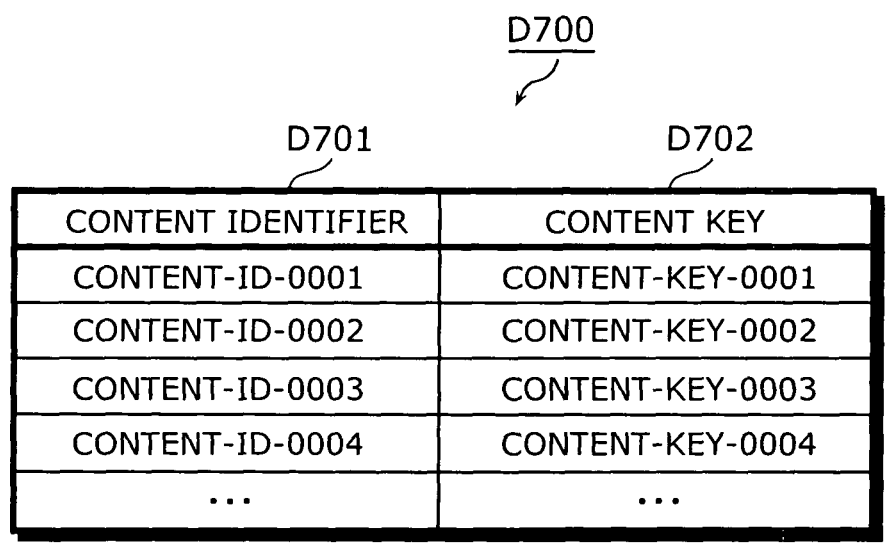
FIG. 5 is a diagram showing a table structure of a content key storage unit 113 according to the embodiment of the present invention.

To be more specific, the content key storage unit 113 holds a content key management table D700. In the content key management table D700, a content identifier D701 and a content key D702 corresponding to the content identifier D701 are managed in relation to each other as shown in FIG. 5.

For example, it is shown that the content key D702, which is used for decoding the encrypted content whose content identifier D701 is "CONTENT-ID-0001", is "CONTENT-KEY-0001".

It should be noted here that a data entry to the content key storage unit 113 is performed by a content provider or the like that performs content encryption.

Next, a construction of the content distribution server 200 is explained in detail.

Figure 6:
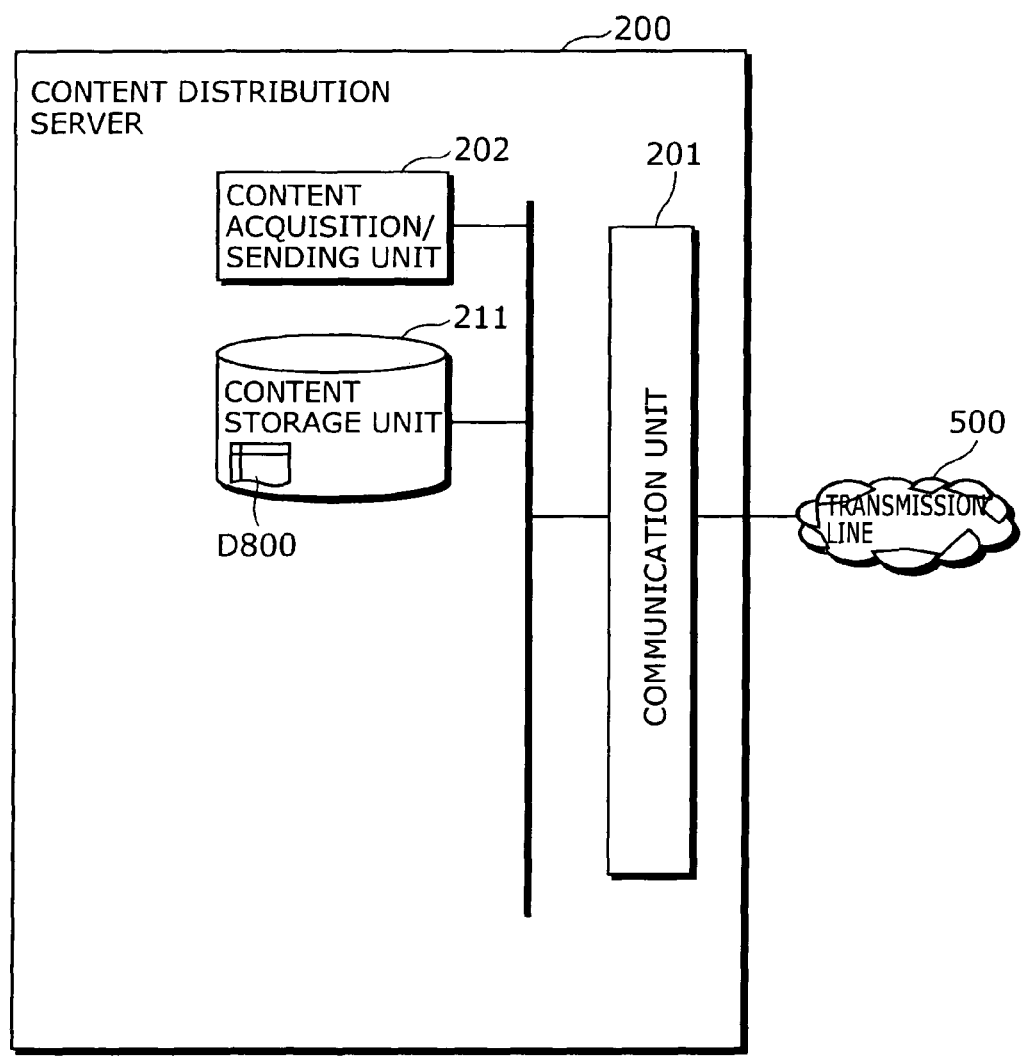
FIG. 6 is a functional block diagram showing a construction of a content distribution server 200 according to the embodiment of the present invention.

FIG. 6 is a functional block diagram showing the construction of the content distribution server 200 shown in FIG. 1.

The content distribution server 200 is composed of: a content storage unit 211 for storing content; a communication unit 201 for connecting to the transmission line 500 to communicate with the terminal device 300; and a content acquisition/sending unit 202 for acquiring a content from the content storage unit 211 and sending the content, on the basis of a request from the terminal device 300.

The content storage unit 211 is a database that manages an encrypted content. When the content is to be sent in response to a content acquisition request from the terminal device 300, this database is used for acquiring the encrypted content corresponding to a content identifier included in the content acquisition request.

Figure 7:
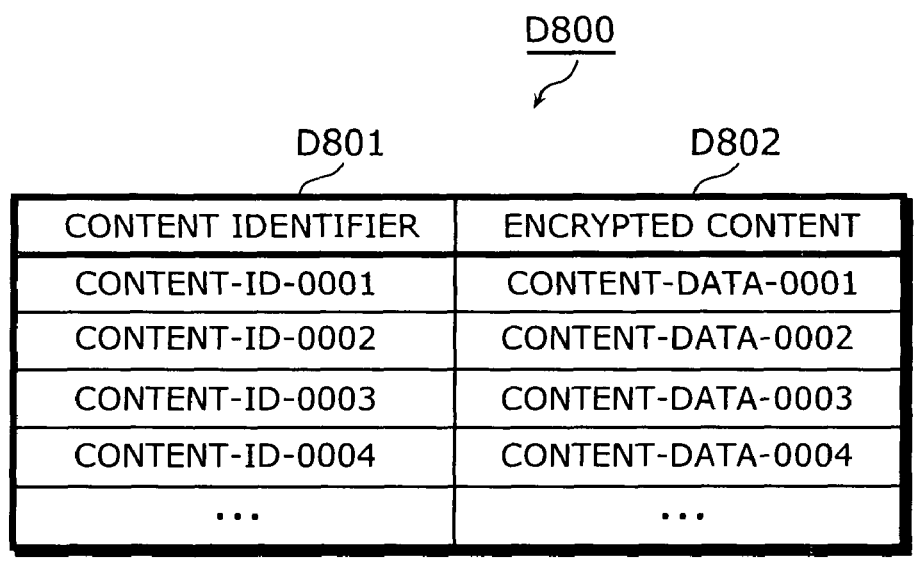
FIG. 7 is a diagram showing a table structure of a content storage unit 211 and a content storage unit 311 according to the embodiment of the present invention.

To be more specific, the content storage unit 211 holds a content management table D800. In the content management table D800, a content identifier D801 and an encrypted content D802 corresponding to the content identifier D801 are managed in relation to each other as shown in FIG. 7.

For example, it is shown that the encrypted content D802, whose content identifier D801 is "CONTENT-ID-0001", is "CONTENT-DATA-0001".

It should be noted here that a data entry to the content storage unit 211 is performed by the content provider or the like that performs content encryption.

Next, the construction of the terminal device 300 is explained in detail.

Figure 8:
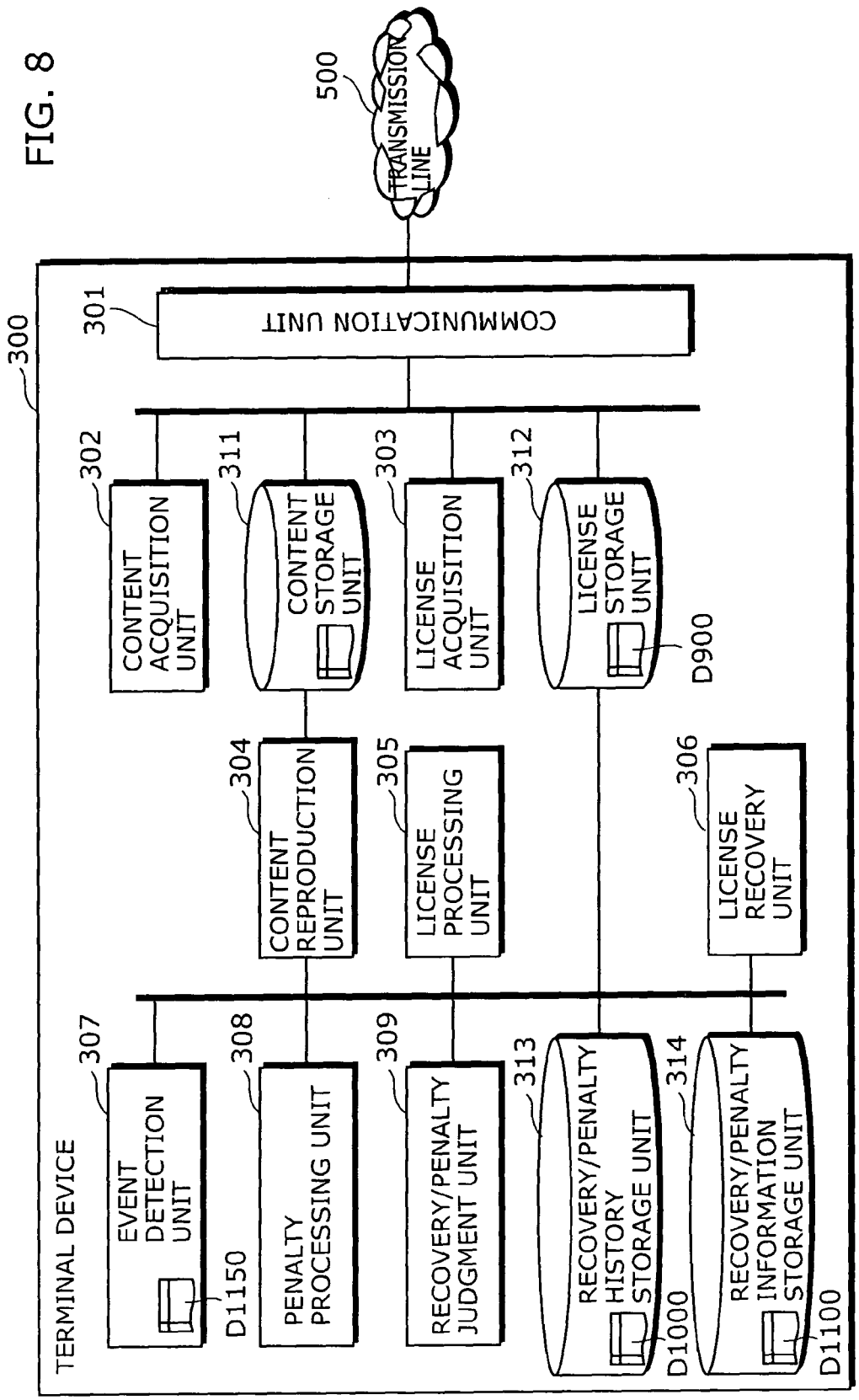
FIG. 8 is a functional block diagram showing a construction of a terminal device 300 according to the embodiment of the present invention.

FIG. 8 is a functional block diagram showing the construction of the terminal device 300 shown in FIG. 1.

The terminal device 300 is composed of: a communication unit 301, a content acquisition unit 302, a license acquisition unit 303, a content reproduction unit 304, a license processing unit 305, a license recovery unit 306, an event detection unit 307, a penalty processing unit 308, a recovery/penalty judgment unit 309, a content storage unit 311, a license storage unit 312, a recovery/penalty history storage unit 313, and a recovery/penalty information storage unit 314.

The communication unit 301 is connected to the transmission line 500 to communicate with the license distribution server 100 and the content distribution server 200.

The content acquisition unit 302 acquires a content from the content distribution server 200.

The content storage unit 311 stores the content acquired from the content distribution server 200. The content storage unit 311 is a database that manages the encrypted content and that is used for acquiring the encrypted content when the content is to be used by the terminal device 300.

To be more specific, the content storage unit 311 holds a content management table similar to the content management table D800 explained together with the content storage unit 211 of the content distribution server 200. It should be noted that a data entry to the content storage unit 311 is performed when the terminal device 300 acquires the content from the content distribution server 200.

The license acquisition unit 303 acquires a license from the license distribution server 100.

The license storage unit 312 stores the license acquired from the license distribution server 100. The license storage unit 312 is a database that manages a license and that is used for acquiring the license corresponding to the content identifier when the content is to be used by the terminal device 300.

To be more specific, the license storage unit 312 holds a license management table D900. In the license management table D900, a license identifier D901, a license D902 corresponding to the license identifier D901, and a lock flag D903 corresponding to the current license are managed in relation to each other, as shown in FIG. 9. Here, the license identifier refers to information for uniquely identifying the license in the terminal device 300.

For example, it is shown that the license whose license identifier D901 is "LICENSE-ID-0001" is "LICENSE-0001". It should be noted that a data entry to the license storage unit 312 is performed when the terminal device 300 acquires the license from the license distribution server 100.

Moreover, the lock flag D903 is information for preventing others from using the corresponding license by reason that the license is currently in use. To be more specific, when the flag is set to "1", this shows that the license is in use and so is unavailable to others. When the flag is reset to "0", this shows that the license is not in use and so is available to others.

The content reproduction unit 304 decodes and reproduces the content.

The license processing unit 305 judges, on the basis of the usage rule, whether or not the license is allowed to be used, and updates the usage rule.

The recovery/penalty history storage unit 313 stores a history including the number of recoveries relating to recovery/penalty judgments. To be more specific, the recovery/penalty history storage unit 313 is a database that manages the recovery/penalty history including the number of recoveries relating to the recovery/penalty judgments. When the terminal device 300 is to judge whether or not a recovery of the license or a penalty on the user is needed, this database is used for acquiring the recovery/penalty history corresponding to an event identifier. Here, the event identifier refers to information for uniquely identifying the event which is to be detected in the contents using system.

To be more specific, the recovery/penalty history storage unit 313 holds a recovery/penalty history management table D1000.

In the recovery/penalty history management table D1000, an event identifier D1001 and the number of recoveries D1002 are managed in relation to each other as shown in FIG. 10, the number of recoveries D1002 showing a cumulative value of the number of recoveries having been performed in the case of the event corresponding to the event identifier D1001.

For example, it is shown that the number of recoveries D1002 corresponding to the event, whose event identifier D1001 is "1", is "2". It should be noted that a data entry to the recovery/penalty history storage unit 313 is performed when the terminal device 300 performs a recovery process or a penalty process.

The recovery/penalty information storage unit 314 stores a threshold value and a process detail relating to the recovery/penalty judgment. To be more specific, the recovery/penalty information storage unit 314 is a database that manages the recovery/penalty information including the threshold value and the detail of the recovery or the penalty which relate to the recovery/penalty judgment. When the terminal device 300 is to judge whether or not the recovery of the license or the penalty on the user is needed, this database is used for acquiring the recovery/penalty information corresponding to the event identifier.

To be more specific, the recovery/penalty information storage unit 314 holds a recovery/penalty information management table D1100. In the recovery/penalty information management table D1100, the following are managed in relation to each other as shown in FIG. 11: the event identifier D1101; an event detail D1102 corresponding to the event identifier D1101; a detection method D1103 showing a detection method for detecting the event detail D1102; a threshold value D1104 used for judging whether or not a recovery or a penalty is needed; a recovery detail D1105 showing a process detail to perform a recovery; and a penalty detail D1106 showing a process detail to perform a penalty.

For example, it is shown that: the event detail D1102 of the event whose event identifier D1101 is "1" is "power down during content reproduction"; the detection method D1103 for the power down during the content reproduction is "detection of locking of license whose content is not being reproduced" and "detection of power supply shutdown by power supply monitoring means"; the threshold value D1104 of the recovery resulting from the power down during the content reproduction is "up to five times per day"; the recovery detail D1105 is "unlocking of license"; and the penalty detail D1106 is "current license unavailable".

It should be noted that a data entry to the recovery/penalty information storage unit 314 may be previously set at the time of manufacturing or prior to shipment of the terminal device 300, or may be set by obtaining the data from an outside source, such as a recovery/penalty information distribution server. Alternatively, the above-mentioned recovery/penalty information may be distributed together with the content so that the data entry to the recovery/penalty information storage unit 314 may be performed at the time of the content acquisition. Or, the recovery/penalty information may be updated in accordance with the usage state of the terminal device 300 and the state how the user of the terminal device 300 uses the terminal device 300. For example, to a malicious user who has received penalties many times, the threshold value D1104 may be set lower and the penalty may be set stricter. An explanation as to a method of distributing the recovery/penalty information in accordance with the states of the user and the terminal is omitted here because it is not the essential feature of the present invention. Also, the recovery/penalty information may be set in the license. In this case, the process can differ from license to license.

Here, the event identifier relates the recovery/penalty history management table D1000 to the corresponding event in the recovery/penalty information management table D1100 and the corresponding event detected by the event detection unit 307. In the case where the terminal device 300 acquires the recovery/penalty information from the recovery/penalty information distribution server set in the contents using system and updates the information as appropriate, the event identifier needs to be unique in the contents using system as described above. However, in the case where the recovery/penalty information is previously embedded in the terminal device 300 and a relation can be established among the recovery/penalty history management table D1000, the corresponding event in the recovery/penalty information management table D1100, and the corresponding event detected by the event detection unit 307, the event identifier may be set unique in the terminal device 300.

The license recovery unit 306 performs the recovery process for the license.

The event detection unit 307 detects a predetermined event that occurs between the start and the normal end of the content usage and that forcefully aborts the usage of the current content. To be more specific, the event detection unit 307 detects the event set in the recovery/penalty information stored in the recovery/penalty information storage unit 314.

The penalty processing unit 308 imposes a penalty on the user.

The recovery/penalty judgment unit 309 judges whether or not the predetermined event is against an intention of the user. To be more specific, the recovery/penalty judgment unit 309 judges whether or not a recovery/penalty is needed on the basis of the recovery/penalty history stored in the recovery/penalty history storage unit 313 and the recovery/penalty information stored in the recovery/penalty information storage unit 314.

Here, the license held by the license storage unit 312 and the data structure of the license are explained once again in the present embodiment. The license is one of pieces of data used in the contents using system.

In general, a content key and a license are assigned for each content item and related to a content identifier. In the present embodiment, the explanation is given on the understanding that the license is assigned for each content item.

Figure 12:
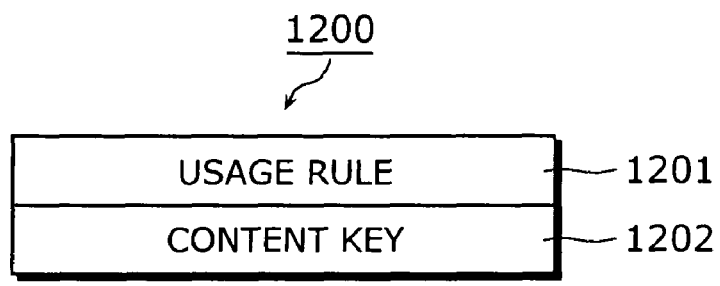
FIG. 12 is a diagram showing a data structure of a license according to the embodiment of the present invention.

Next, the data structure of the license is explained with reference to FIG. 12. A license 1200 is composed of: a usage rule 1201 showing a rule under which a content is allowed to be used; and a content key 1202 used for decoding an encrypted content that corresponds to the license 1200.

Here, the usage rule 1201 includes the number of times the content corresponding to the license 1200 is allowed to be used, such as "ten times", and an allowed time period of usage during which the content is allowed to be used, such as "Dec. 1, 2002 to Feb. 13, 2003". It should be noted that the license 1200 needs to be related to the content identifier in the license storage unit 312 as well as in the process regarding the license. On account of this, the content identifier may be included in the license 1200 for the purpose of omitting the process performed by the terminal device 300 to relate the license 1200 to the content identifier.

Here, the license distribution server 100, the content distribution server 200, and the terminal device 300 described above are composed of the respective data storage units and the respective processing units. Each data storage unit is realized by a recording medium, such as a memory or an HDD. Each processing unit is realized by hardware such as an LSI or a program executed using a CPU, a RAM, or a ROM.

Note that it is preferable that each storage unit and each processing unit of the terminal device 300 is tamper-resistant hardware or software.

Next, explanations are given one by one about processes required to be performed in the contents using system from when the terminal device 300 uses the content to when a license recovery or a penalty imposition on the user is performed in the case of the predetermined event. Before these processes are realized, the terminal device 300 needs to perform a license acquisition process, a content acquisition process, a content usage process, a preparation process for event detection, and a recovery/penalty process in the case of the event detection, which are first explained here.

The following are the explanations about the license acquisition process, the content acquisition process, the content usage process, the preparation process for event detection, and the recovery/penalty process in the case of the event detection, in this order with reference to FIGS. 13 to 24. These processes are performed by the terminal device 300 in the contents using system constructed as described so far.

Figure 13:
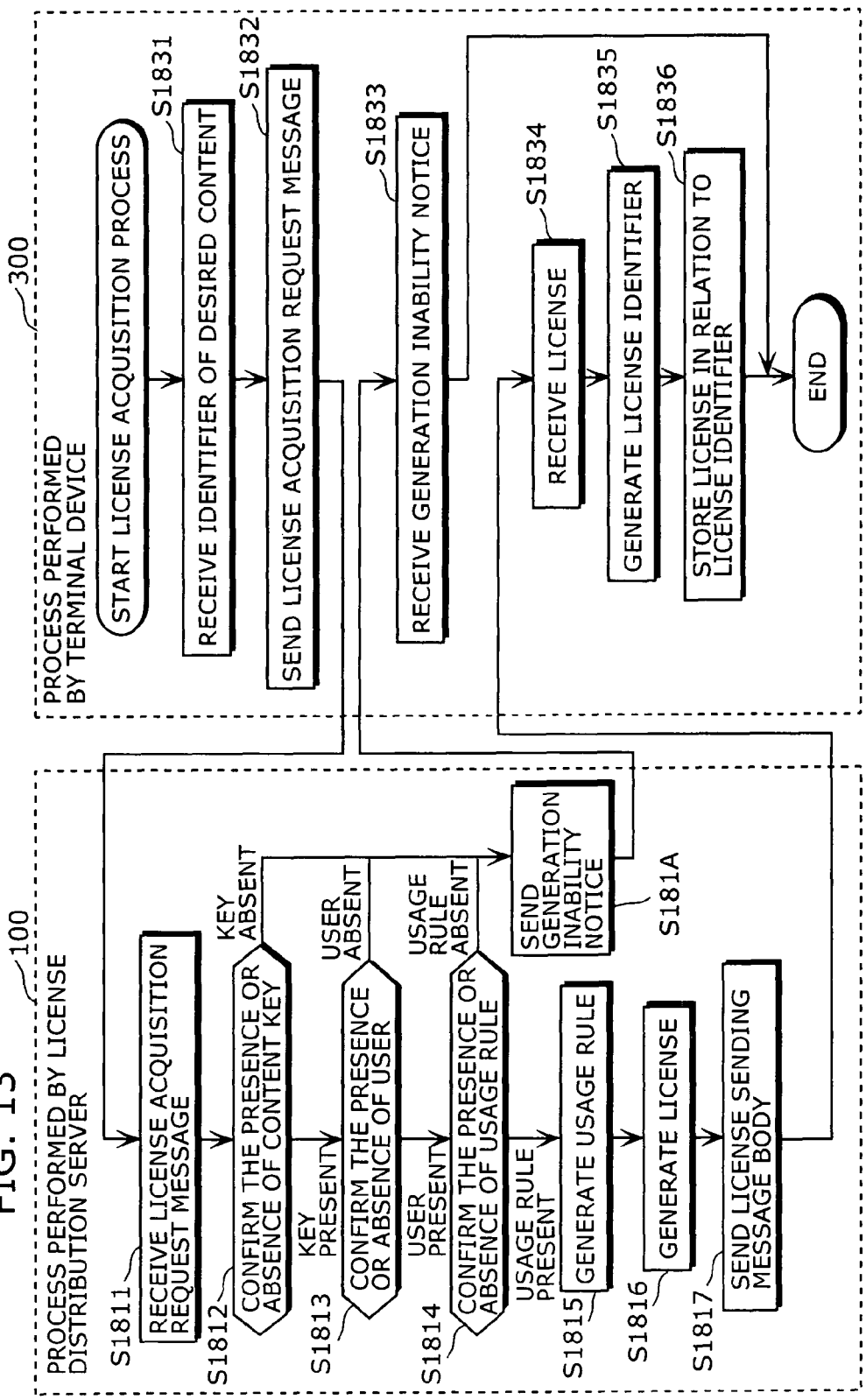
FIG. 13 is a flowchart showing a process performed by the terminal device 300 to acquire a license from the license distribution server 100, according to the embodiment of the present invention.

Next, each process performed by the corresponding unit of the terminal device 300 before the license is acquired from the license distribution server 100 is explained with reference to FIG. 13.

When acquiring a license, the user needs to at least enter either the content identifier as one of pieces of information that specifies the desired license or information based on the content identifier into an application of the terminal device 300. In this example, the explanation is given as follows on the understanding that the user inputs the content identifier "CONTENT-ID-0001" to start the license acquisition process.

The license acquisition unit 303 of the terminal device 300 receives the content identifier of the desired content from the user (S1831), and starts the license acquisition process. Then, the license acquisition unit 303 generates a license acquisition request message and sends the message to the license distribution server 100 via the communication unit 301 (S1832).

Here, an explanation is given about communication messages including the license acquisition request message treated in the present embodiment.

Figure 14:
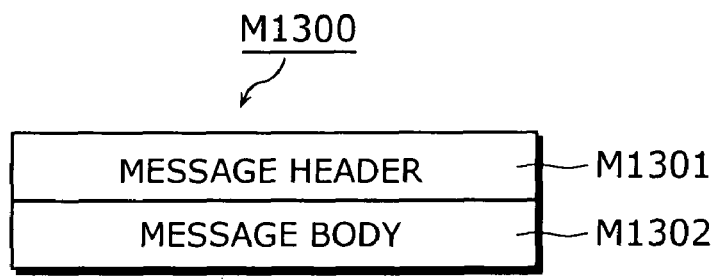
FIG. 14 is a diagram showing a structure of a communication message according to the embodiment of the present invention.

FIG. 14 is a diagram showing a message format structure of a communication message M1300 received and sent in communications between the terminal device 300 and the license distribution server 100 or the content distribution server 200.

As shown in FIG. 14, the communication message M1300 is made up of a message header M1301 and a message body M1302.

The message header M1301 includes at least information identifying a sending destination and information identifying a sending source. The information identifying the sending destination is referenced to as a destination of a message whereas the information identifying the sending source is referenced to as a destination when replying to the message. An IP address is a typical example of information used for identifying the sending destination or the sending source.

Figure 15:
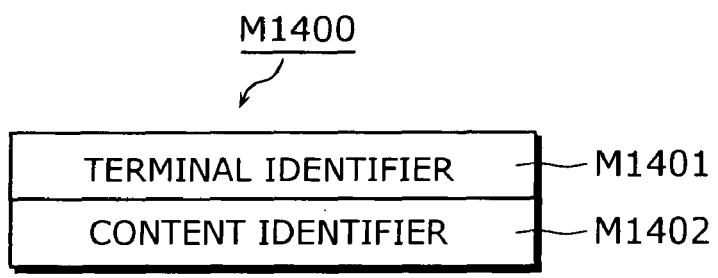
FIG. 15 is a diagram showing a structure of a body of a license acquisition request message according to the embodiment of the present invention.

The message body M1302 includes information that is unique to each message. For example, a license acquisition request message body M1400 mentioned above is information unique to this message, and is made up of a terminal identifier M1401 and a content identifier M1402 as shown in FIG. 15. To the terminal identifier M1401, a terminal identifier of the terminal device 300 that sends the license acquisition request message, that is, "TERMINAL-ID-0001" for example, is set. To the content identifier M1402, a content identifier "CONTENT-ID-0001" inputted by the user is set.

The communication unit 101 of the license distribution server 100 receives the license acquisition request message via the user information management table D500 (S1811). Then, the license generation/sending unit 102 extracts the content identifier M1402 from the license acquisition request message body M1400, and judges whether or not a content key corresponding to the content identifier M1402 is present in the content key storage unit 113 (S1812).

When the content key is not present, the license generation cannot be performed. Thus, the license generation/sending unit 102 terminates the license generation process, and sends the terminal device 300 a reply message which includes a generation inability notice in its message body to show that the content key is not present, that is to say, the content identifier is invalid (S181A).

When the content key is present, the license generation/sending unit 102 acquires the content key and performs the remainder of the process. It should be noted that the explanation will continue in the present embodiment on the understanding that the content key "CONTENT-KEY-0001" corresponding to the content identifier "CONTENT-ID-0001" is present as shown in FIG. 5.

The license generation/sending unit 102 extracts the terminal identifier M1401 from the license acquisition request message body M1400 and judges, using the terminal identifier M1401, whether or not the user identifier D501 is present in the user information management table D500 held in the user information storage unit 111. More specifically, the license generation/sending unit 102 confirms the presence or absence of the user (S1813). When either the terminal identifier M1401 or the user identifier D501 is not present in relation to the other in the user information management table D500, the terminal device 300 that sent the license distribution request message is judged not to have signed up for the content distribution service. That is to say, the license generation/sending unit 102 judges that there is no user. Thus, the license generation/sending unit 102 cannot generate a license usage rule and so terminates the license generation process and sends the terminal device 300 a reply message which includes a generation inability notice in its message body to show that the terminal identifier is not present (S181A).

When the terminal identifier M1401 and the user identifier D501 are present in relation to each other, the license generation/sending unit 102 judges that there is the user. After acquiring the user identifier D501, the license generation/sending unit 102 performs the remainder of the process. It should be noted that the explanation will continue in the present embodiment on the understanding that the user identifier "USER-ID-0001" is present corresponding to the terminal identifier "TERMINAL-ID-0001" as shown in FIG. 3.

On the basis of the user identifier D501 and the content identifier M1402 that was extracted from the license acquisition request message body M1400, the license generation/sending unit 102 judges whether or not the corresponding usage rule is present in the usage rule management table D600 held in the usage rule storage unit 112. That is to say, the license generation/sending unit 102 confirms the absence or presence of the usage rule (S1814).

To be more specific, the license generation/sending unit 102 identifies a record in which the user identifier D601 and the content identifier D602 of the usage rule management table D600 respectively match the user identifier D501 and the content identifier M1402. When there is no such record, the license generation/sending unit 102 judges that the usage rule is not present. Thus, the license generation/sending unit 102 sends the terminal device 300 a reply message which includes a generation inability notice in its message body to show that the usage rule is not present (S181A)

When such record is present, the license generation/sending unit 102 judges that there is a usage rule and generates the usage rule to be distributed on the basis of the stored usage rule (S1815). As a generation method employed at this time, the entire usage rule described in the record may be generated or part of the usage rule described in the record may be generated, for example.

Here, an explanation is given using a specific example. As the usage rule of the record identified by the user identifier "USER-ID-0001" and the content identifier "CONTENT-ID-0001": the valid period is "until 2003/1/30"; and the allowed number of usages is "ten times". In the case where the entire usage rule is to be distributed, the allowed number of usages which is a variable usage allowance rule is generated as "ten times", so that the allowed number of usages for this record after the generation is "0 times".

Moreover, in the case where part of the right of the user is to be distributed, the terminal device 300 may be instructed to send the license acquisition request message including the number of times desired by the user, such as three times. Accordingly, the allowed number of usages may be generated as "three times" as requested, so that the allowed number of usages for the record after the generation may be "seven times". Furthermore, in the case where the allowed number of usages is predetermined as "once" for each generation according to the service, the allowed number of usages may be generated as "once", so that the allowed number of usages for the record after the generation is "nine times". Although various kinds of service can be considered in this way, detailed explanations are not given since it is not the essential feature of the present invention.

In the present case, the explanation is given on the precondition that the allowed number of usages is distributed as "ten times".

After the generation of the usage rule, the license generation/sending unit 102 generates the license (S1816). This license generation is performed by setting the generated usage rule to the usage rule 1201 and setting the pre-acquired content key to the content key 1202. Then, after the generation of the license, the license generation/sending unit 102 sends a license sending message body M1500 to the terminal device 300 via the communication unit 101 (S1817).

Figure 16:
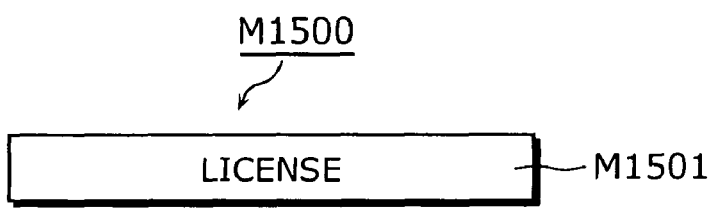
FIG. 16 is a diagram showing a structure of a body of a license sending message according to the embodiment of the present invention.

The license sending message body M1500 is made up of a license M1501 as shown in FIG. 16, and is created by setting the license 1200 to the license M1501.

The license acquisition unit 303 of the terminal device 300 receives the license sending message body M1500, that is, the license M1501, via the communication unit 301 (S1834). Then, the license acquisition unit 303 generates a license identifier that is unique in the terminal device (S1835). Moreover, the license acquisition unit 303 stores the acquired license M1501 in the license storage unit 312 in relation to the content identifier which is identical to the content identifier M1402 included in the license acquisition request message and in relation to the license identifier (S1836), and terminates the content acquisition process. In the case where the content identifier is to be included in the license 1200, the process performed in order to relate the license to the content identifier is not necessary.

On the other hand, when receiving the reply message including the generation inability notice from the license distribution server 100 (S1833), the license acquisition unit 303 presents a reason for the generation inability included in the reply message to the user and terminates the license acquisition process.

Next, an explanation is given about processes performed by the respective units of the terminal device 300 in order to obtain the content from the content distribution server 200.

Figure 17:
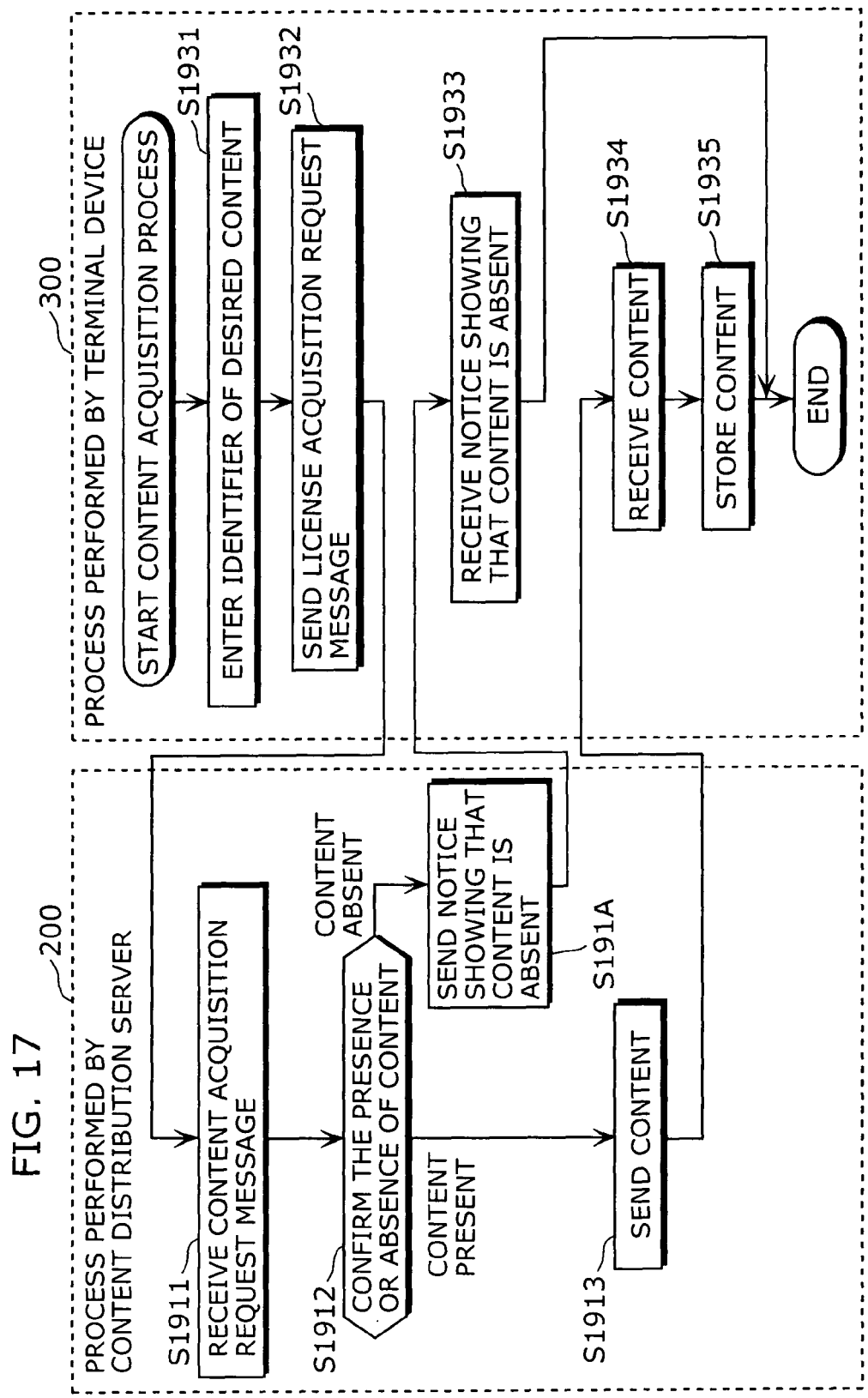
FIG. 17 is a flowchart showing a process performed by the terminal device 300 to acquire a content from the content distribution server 200, according to the embodiment of the present invention.

FIG. 17 is a flowchart showing an operation of a content acquisition process performed between the terminal device 300 and the content distribution server 200.

The terminal device 300 starts the content acquisition process in accordance with an information entry to an application of the terminal device 300 and a content acquisition instruction from the user (S1931). The user needs to at least enter either the content identifier as one of pieces of information that specifies the desired license or information based on the content identifier into the application of the terminal device 300. In this example, the explanation is given as follows on the understanding that the user enters the content identifier "CONTENT-ID-0001" to start the license acquisition process.

Receiving the information entry from the user, the content acquisition unit 302 of the terminal device 300 generates a content acquisition request message and sends the message to the content distribution server 200 via the communication unit 301 (S1932).

Figure 18:
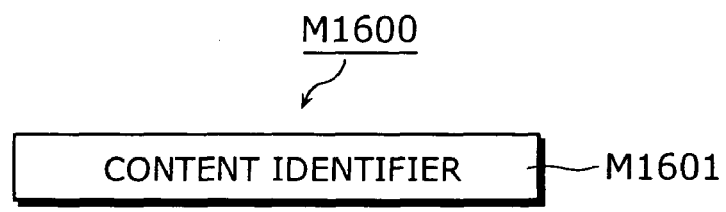
FIG. 18 is a diagram showing a structure of a body of a content acquisition request message according to the embodiment of the present invention.

As shown in FIG. 18, a content acquisition request message body M1600 is made up of a content identifier M1601.

To the content identifier M1601 included in the content acquisition request message body M1600, the content identifier "CONTENT-ID-0001" entered by the user is set.

The communication unit 201 of the content distribution server 200 receives the content acquisition request message via the transmission line 500 (S1911).

The content acquisition/sending unit 202 extracts the content identifier M1601 from the content acquisition request message body M1600, and judges whether or not a content corresponding to the content identifier M1601 is present in the content storage unit 211 (S1912).

When the content is not present, the content distribution cannot be performed. Thus, the content acquisition/sending unit 202 terminates the process, and sends the terminal device 300 a reply message which includes a notice in its message body to show that such content is not present, that is to say, the content identifier is invalid (S191A).

On the other hand, when the content is present, the content acquisition/sending unit 202 acquires the content and performs the remainder of the process. It should be noted that the explanation will continue in the present embodiment on the understanding that the content of "CONTENT-DATA-0001" corresponding to the content identifier "CONTENT-ID-0001" is present as shown in FIG. 7.

The content acquisition/sending unit 202 sets the requested content to content data M1701 of a content sending message body M1700, and sends the message body to the terminal device 300 via the communication unit 201 (S1913).

Figure 19:
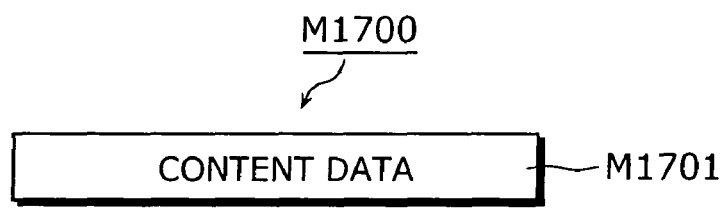
FIG. 19 is a diagram showing a structure of a body of a content sending message according to the embodiment of the present invention.

The content sending message body M1700 is made up of the content data M1701 as shown in FIG. 19.

The content acquisition unit 302 of the terminal device 300 receives the content sending message body M1700 via the communication unit 301 and thus acquires the content data M1701 (S1934).

The content acquisition unit 302 stores the acquired content data M1701 in the content storage unit 311 in relation to the content identifier which is identical to the content identifier M1601 included in the content acquisition request message (S1935), and terminates the content acquisition process. In the case where the content identifier is included in the content data M1701, the process performed in order to relate the content to the content identifier is not necessary.

On the other hand, when receiving the reply message, which includes the notice showing that such content is not present, from the content distribution server 200 (S1933), the content acquisition unit 302 presents a reason for the generation inability included in the reply message to the user and terminates the content acquisition process.

Next, an explanation is given about a process that is performed to use the content with the acquired content and license.

Figure 20:
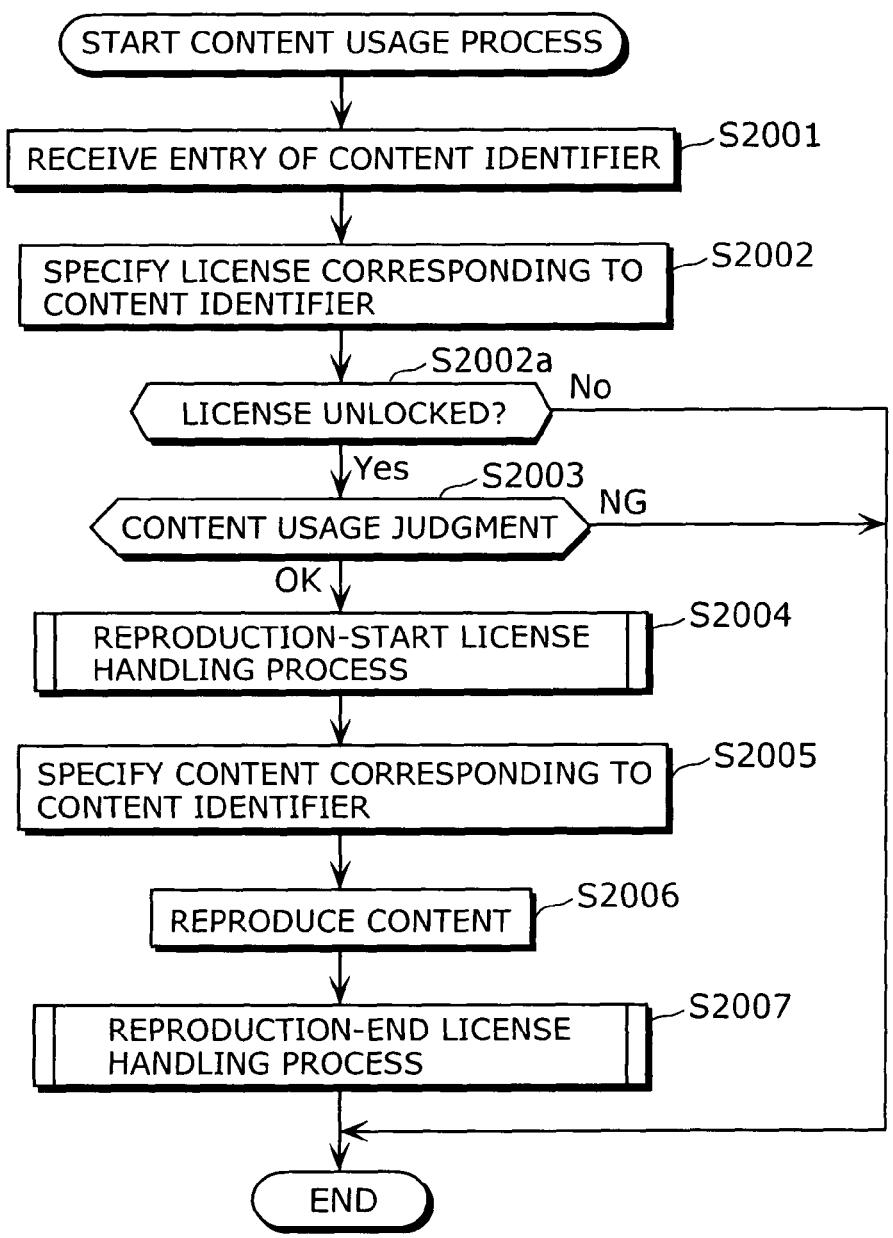
FIG. 20 is a flowchart showing a process performed by the terminal device 300 to reproduce the content and finish the reproduction, according to the embodiment of the present invention.

FIG. 20 is a flowchart showing processes performed by the corresponding units of the terminal device 300 to start and end the content usage by using the content stored in the content storage unit 311 and the license stored in the license storage unit 312.

The terminal device 300 starts the content reproduction process in accordance with an information entry to an application of the terminal device 300 and a content reproduction instruction from the user (S2001). The user needs to at least enter either the content identifier as one of pieces of information that specifies the desired content or information based on the content identifier into the application of the terminal device 300. In this example, the explanation is given as follows on the understanding that the user enters the content identifier "CONTENT-ID-0001" to start the content reproduction process.

The license processing unit 305 specifies the license corresponding to the content to be reproduced on the basis of the content identifier entered by the user (S2002), and thus acquires the specified license from the license storage unit 312. Then, the license processing unit 305 judges whether or not the acquired license is unlocked (S2002a). This judgment is made on the basis of whether a value of the lock flag D903 is "0" or "1".

When the license is locked (No in S2002a), the license processing unit 305 judges that the content corresponding to the current license is in use and so the license is not available. Thus, the license processing unit 305 terminates the content usage process.

When the license is unlocked (Yes in S2002a), the license processing unit 305 judges that the content corresponding to the current license is not in use. Then, the license processing unit 305 acquires the usage rule included in the license and judges, on the basis of the usage rule, whether or not the usage is allowed (S2003).

To be more specific, the usage rule includes the valid period, the allowed number of usages, etc. as described with reference to FIG. 4. In the case where the usage rule is defined by the valid period, for example, the license processing unit 305 acquires a reliable current time of day, and gives OK for usage when the current time of day is included in the valid period and gives NG for usage when the time is not included in the valid period. In the case where the usage rule is defined by the allowed number of usages, for example, the license processing unit 305 gives OK for usage when "once" or more is left as the allowed number of usages and gives NG for usage when the number of reproduction times is 0. It should be noted that the items of the usage rule are not limited to these.

When the usage is NG, the license processing unit 305 notifies the user that the desired content is not available and terminates the process. It should be noted that this notice may include a reason for NG, such as "outside of the valid period" or "the number of reproduction times is 0".

When the usage is OK, the license processing unit 305 carries out a reproduction-start license handling process (S2004).

Figure 21:
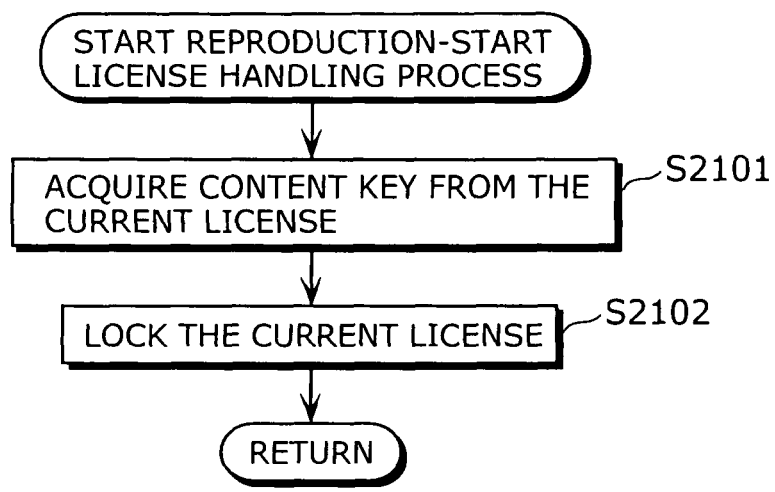
FIG. 21 is a flowchart showing a reproduction-start license handling process according to the embodiment of the present invention.

FIG. 21 is a flowchart showing a subroutine of the reproduction-start license handling process (S2004 in FIG. 20).

The license processing unit 305 acquires a content key from the current license to decode the encrypted content (S2101). Then, the license processing unit 305 performs a locking process so as to prevent the current license from being used by others until after an unlocking process is performed (S2102). More specifically, "1" is set to the lock flag in relation to the current license. Then, the license processing unit 305 returns to the main routine shown in FIG. 20.

After the completion of the content reproduction-start license handling process, the license processing unit 305 sends the content key acquired in the reproduction-start license handling process to the content reproduction unit 304 together with the content identifier.

The content reproduction unit 304 specifies the encrypted content to be reproduced on the basis of the content identifier received from the license processing unit 305 (S2005), and acquires the content from the content storage unit 311. Then, the content reproduction unit 304 decodes the encrypted content using the content key received from the license processing unit 305 and thus reproduces the content (S2006).

When a reproduction stop instruction is received from the user or when the reproduction of the current content has been finished, the content reproduction unit 304 ends the content reproduction and sends reproduction details and a reproduction end notice to the license processing unit 305 together with the content identifier. Here, the reproduction details include information showing how far the content was reproduced, such as ten minutes or once, to be more specific.

The license processing unit 305 specifies the license corresponding to the content whose reproduction has been finished, on the basis of the content identifier received from the content reproduction unit 304, and thus acquires the license from the license storage unit 312.

Then, the license processing unit 305 executes a reproduction-end license handling process (S2007), and terminates the content reproduction process.

Figure 22:
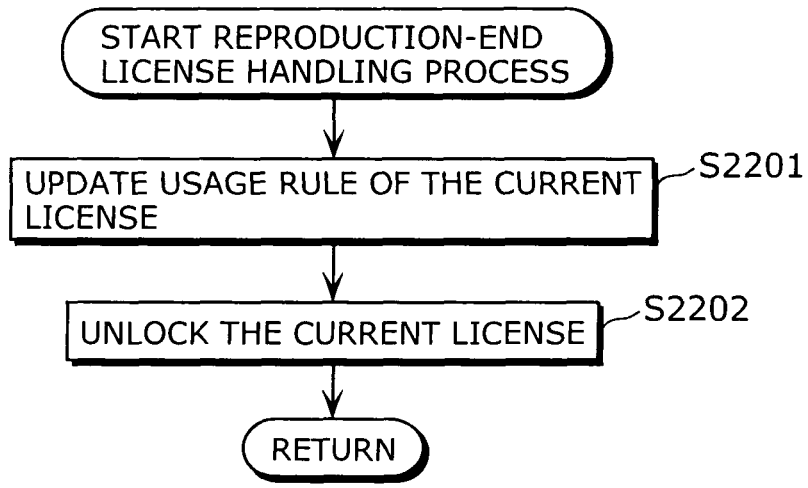
FIG. 22 is a flowchart showing a reproduction-end license handling process according to the embodiment of the present invention.

FIG. 22 is a flowchart showing a subroutine of the reproduction-end license handling process (S2007 in FIG. 20).

The license processing unit 305 updates the usage rule included in the license, in accordance with the reproduction details received from the content reproduction unit 304 (S2201). To be more specific, when the allowed number of usages included in the usage rule is "ten times" and the number of reproduction times included in the reproduction details is "once", the allowed number of usages in the usage rule is updated to "nine times". It should be noted that the items of the usage rule and an updating rule for the usage rule are not limited to these.

After updating the usage rule, the license processing unit 305 unlocks the license to allow for usage (S2202). To be more specific, the lock flag is reset to "0".

In this way, the terminal device 300 performs the processes from when receiving the content reproduction instruction from the user to when ending the reproduction.

In the above description, the content reproduction unit 304 sends the content identifier to the license processing unit 305 at the end of the content reproduction. However, the license processing unit 305 may store the content identifier until the end of the content reproduction. Moreover, although the above description has been given using the content identifier as an example of information that identifies the license, the license identifier explained earlier may be entered. The entry of the license identifier is useful in the case where a plurality of licenses are present corresponding to the same content identifier.

Next, an explanation is given about a process performed by the terminal device 300 to prepare for detection of event details stored in the recovery/penalty information storage unit 314.

Figure 23:
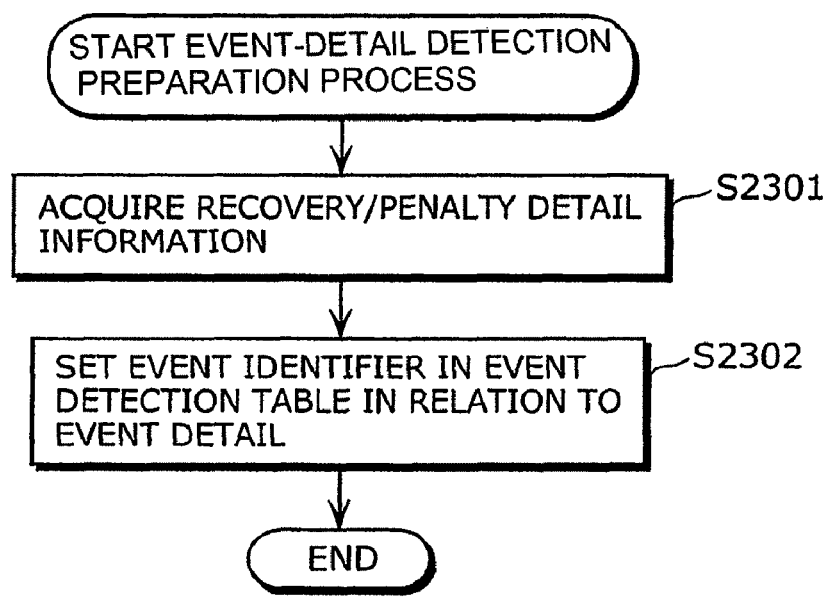
FIG. 23 is a flowchart showing a process performed by the terminal device 300 to prepare for event detection, according to the embodiment of the present invention.

FIG. 23 is a flowchart showing an operation of the event-detection preparation process performed by the event detection unit 307. It should be noted that this event-detection preparation process by the event detection unit 307 is performed when: the terminal device 300 is manufactured; the power to the terminal device 300 is turned on; the recovery/penalty information is updated; or the hardware construction of the terminal device 300 is changed, such as when a new event detection means is added.

The event detection unit 307 first acquires an event identifier D1101, an event detail D1102, and a detection method D1103. (S2301).

The event detection unit 307 has at least one event detection means. When having a detection means matching the above-mentioned detection method D1103, the event detection unit 307 sets the event identifier D1101 corresponding to this detection method D1103 and the event detail D1102 into an event detection table D1150, and thus prepares for detection of the event detail D1102 (S2302).

As a specific example, an explanation is given about a case where the event detection unit 307 has a "power supply monitoring means" and the recovery/penalty information includes: "1" as the event identifier D1101, "power down during content reproduction" as the event detail D1102, and "detection of power supply shutdown by power supply monitoring means" as the detection method D1103; and "2" as the event identifier D1101, "card insertion/removal during content reproduction" as the event detail D1102, and "detection of card removal by card insertion/removal monitoring means" as the detection method D1103.

The event detection unit 307 stores, out of two detection methods D1103 set in the recovery/penalty information, "detection of power supply shutdown by power supply monitoring means" as the detection method D1103 that is possible using the detection means provided for the unit 307, as well as storing "1" as the event identifier D1101 and "power down during content reproduction" as the event detail D1102 corresponding to this detection method D1103.

According to the process as described so far, the preparation process for the event detection is performed.

Figure 24:
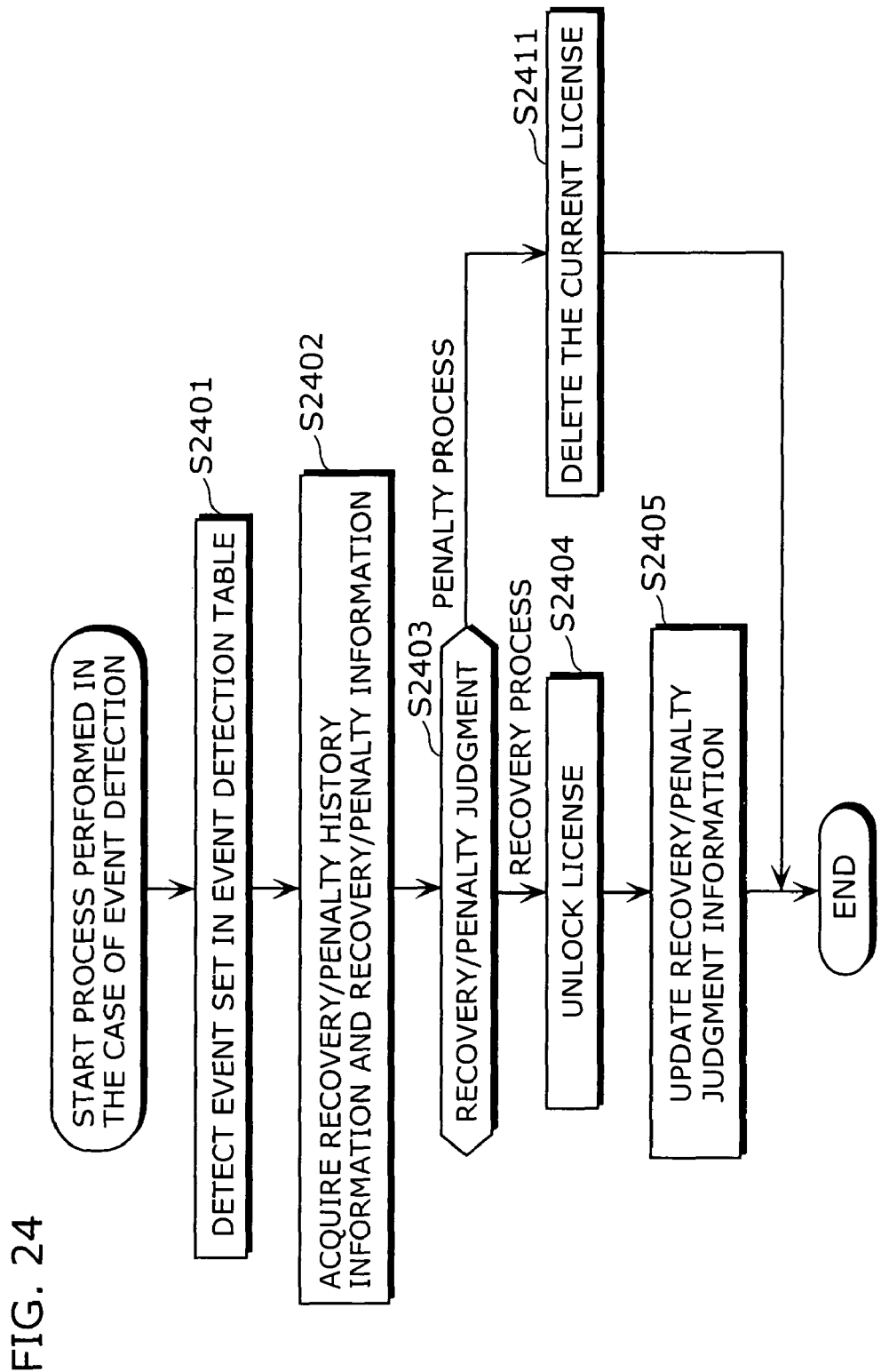
FIG. 24 is a flowchart showing a process performed by the terminal device 300 to detect an event and then perform a license recovery or a penalty imposition.

Next, an explanation is given about a recovery process for the license or a penalty process that is performed by the corresponding units of the terminal device 300 in the case of event detection after the event detection preparation is finished, with reference to FIG. 24.

FIG. 24 is a flowchart showing an operation of a process performed in the case of event detection.

The event detection unit 307 detects the detection detail set in the event detection table D1105 in the detection preparation process (S2401). After detecting the detection detail, the event detection unit 307 sends the corresponding event identifier D1101 to the recovery/penalty judgment unit 309.

On the basis of the event identifier D1101 received from the event detection unit 307, the recovery/penalty judgment unit 309 acquires the recovery/penalty history corresponding to the detection detail from the recovery/penalty history storage unit 313, and thus acquires the recovery/penalty information, which is specified corresponding to the detection detail, from the recovery/penalty information storage unit 314 (S2402).

The recovery/penalty judgment unit 309 performs the recovery/penalty judgment process by comparing the number of recoveries D1002 included in the recovery/penalty history with the threshold value D1104 included in the recovery/penalty information (S2403).

Here, a more detailed explanation is given about the recovery/penalty judgment process.

When the number of recoveries D1002 is smaller than the threshold value D1104, the recovery/penalty judgment unit 309 judges that the recovery process is to be performed. When the number of recoveries D1002 is equal to or larger than the threshold value D1104, the recovery/penalty judgment unit 309 judges that the penalty process is to be performed. More specifically, when the number of recoveries D1002 is "twice" and the threshold value D1104 is "ten times", the judgment is made to perform the recovery process. When the number of recoveries D1002 is "twice" and the threshold value D1104 is "twice", the judgment is made to perform the penalty process. It should be noted that when the number of recoveries D1002 is equal to or larger than the threshold value D1104, no process may be performed.

First, an explanation is given about a case where the judgment has been made to perform the recovery process in S2403 of FIG. 24.

When judging that the recovery process is to be performed, the recovery/penalty judgment unit 309 sends a recovery instruction to the license recovery unit 306 together with the recovery detail D1105 included in the recovery/penalty information.

Here, the following explanation is given on the understanding that "unlocking" is set to the recovery detail D1105.

The license recovery unit 306 performs a process of "unlocking" set to the recovery detail D1105 received from the recovery/penalty judgment unit 309 (S2404).

More specifically, the license recovery unit 306 unlocks the license that is in the locked state in the license storage unit 312. To give a more detailed description, the lock flag corresponding to the current license is reset to "0".

After the completion of the license recovery process, the license recovery unit 306 sends a recovery completion notice to the recovery/penalty judgment unit 309.

Receiving the recovery completion notice from the license recovery unit 306, the recovery/penalty judgment unit 309 specifies the recovery/penalty history corresponding to the detection detail from the recovery/penalty history storage unit 313 on the basis of the event identifier D1101, and then updates the history (S2405). To be more specific, the recovery/penalty judgment unit 309 adds one to the value of the number of recoveries D1002 corresponding to the event identifier D1101.

It should be noted that not the number of license unlockings, but the number of unlocked licenses or an unlocking frequency may be stored.

Moreover, although the number of recoveries is managed for each terminal in the above description, the number may be managed for each license.

Next, an explanation is given about a case where the judgment has been made to perform the penalty process in S2403 of FIG. 24.

When judging that the penalty process is to be performed, the recovery/penalty judgment unit 309 sends a penalty instruction to the penalty processing unit 308 together with the penalty detail D1106 included in the recovery/penalty information.

Here, the following explanation is given on the understanding that "the current license not available" is set to the penalty detail D1106.

The penalty processing unit 308 performs a process for "the current license not available" set to the penalty detail D1106 received from the recovery/penalty judgment unit 309 (S2411). To be more specific, the penalty processing unit 308 deletes the license which is in the locked state in the license storage unit 312.

Here, a method for detecting the "power down during content reproduction" is explained.

First, an explanation is given about a detection method using the "power supply monitoring means".

When a power down occurs, the power supply monitoring means judges whether or not the content is being reproduced. When the content is being reproduced, the power supply monitoring means records a power down flag.

When the terminal device 300 recovers from the power down, the power supply monitoring means verifies the power down flag. When the power down flag is present, the power supply monitoring means performs the process which is performed in the case of the event detection as described above.

Next, an explanation is given about a "locking of license whose content is not being reproduced".

As described above, the license processing unit 305 locks the current license at the start of the content reproduction and unlocks the license at the end of the content reproduction.

Thus, when a locked license is present in the license storage unit 312 while no content is being reproduced, a judgment can be made that an event, such as power down during the content reproduction, that prevents the license processing unit 305 from detecting the end of the content reproduction has been occurring.

The same judgment can also be made in the case where a reproduction start log is recorded, in place of the locking of the license, at the start of the content reproduction and the end of the content reproduction is written into this log when the reproduction is ended.

According to the judgment method described so far, the power down flag, the locking of the license, and the reproduction start flag are verified when: the power is turned on; a list of reproducible contents is displayed; or the content reproduction is started, for example, or at regular time intervals.

Here, an explanation is given about a case where the power down occurs to the above-described terminal device 300 during the content reproduction.

When the power down occurs during the content reproduction, the license corresponding to the currently-reproduced content is stored in the locked state into the license storage unit 312 because the unlocking process to be performed at the end of the content reproduction has not been executed. Thus, even after the terminal device 300 recovers from the power down, the license is not available due to its locked state. For this reason, the recovery process is performed to unlock the current license.

Accordingly, in the case of the predetermined event, such as a power down, the invention described in the present embodiment allows for a recovery from the disadvantage caused to the user by the predetermined event and for a penalty imposition on the user when the occurrence of the predetermined event exceeds a specified rule. In this way, the present invention can protect the right of the authorized user as well as preventing the fraudulent use of the right.

It should be noted that although the current license is locked at the start of the content reproduction in the above description, the usage rule may be reduced by a predetermined amount.

More specifically, the allowed number of usages as the usage rule may be reduced by one in advance at the start of the content reproduction. In this case, when the reproduction time period included in reproduction result information at the end of the content reproduction is less than once-definition information that defines "once", one is added to the allowed number of times as the usage rule. Thus, when the usage rule of the license is reduced by the predetermined amount at the start of the content reproduction, one is added to the allowed number of usages in the recovery process as well.

Moreover, although the process at the end of the content reproduction is performed as the recovery process in the above description, a different process may be performed.

For example, instead of the case where the recovery process is performed so that a ten-minute period is reduced from the allowed time period at the start of the content reproduction and then a value obtained by subtracting a reproduction time period included in the reproduction result information from the ten-minute period is added at the end of the content reproduction, a five-minute period may be added regardless of the presence or absence of the reproduction time period.

Furthermore, the event to be detected is "power down during content reproduction" in the above description. However, it is also effective to detect power down occurring while the terminal device 300 is transferring the license to another terminal device 300 or power down occurring while the terminal device is transferring the license to an external medium.

Also, the terminal device 300 judges whether or not to perform a recovery or impose a penalty in the above description. However, when detecting the event set in the recovery/penalty information storage unit 314, the terminal device 300 may connect to a server to request a judgment as to whether to perform a recovery or impose a penalty. Alternatively, when detecting the event set in the recovery/penalty information storage unit 314, the terminal device 300 may make the judgment until a threshold value set in the recovery/penalty information storage unit 314 is exceeded and, when the threshold value has been exceeded, may connect to the server to request the judgment as to whether to perform a recovery or impose a penalty. It should be noted that information specifying which is predominant in making the recovery/penalty judgment may be included in the license. To be more specific, information that shows the recovery/penalty judgment is made "by the terminal device 300", "by the server", or "by the terminal device 300 when below the threshold value, but by the server when exceeding the threshold value" may be set in the license in relation to a flag.

Moreover, although the functional blocks which perform the license recovery and impose the penalty on the user are all present in the terminal device 300 in the above description, they may be realized using a plurality of terminal devices and packages. To be more specific, the terminal device may be composed of the content acquisition unit 302, the content reproduction unit 304, and the content storage unit 311 whereas the other functional blocks may be implemented on an IC card or the like with a high level of security that is connected to the terminal device via a card interface.

In this case, when the IC card is removed from the terminal device during the content reproduction, the license processing unit 305 cannot detect the end of the content reproduction.

In the case of such a construction, it is effective to set "IC card removal detection by card insertion/removal monitoring means" as a detection detail.

When this detection detail is detected, a warning may be displayed on a display device, such as a display, so as to notify the user of a warning detail. For example, a message saying "You have removed the card three times during the content reproduction. If removing the card ten times, you are judged to commit fraud and your card will be cancelled" may be displayed, and the user may be notified of a threshold value and a penalty detail together with the detection detail. With this, the event as a detection object is prevented from occurring.

Additionally, a warning may be issued in the case where the event as the detection object is likely to occur. For example, when a lid of a section into which the card is to be inserted is opened during the content reproduction, the warning may be issued. Here, although the explanation has been given about the case where the event as the detection object for the recovery/penalty judgment and the event as the detection object for the warning issuance are the same, a different event may be separately set for each of the recovery/penalty judgment and the warning issuance. Moreover, the events as the detection objects for the recovery and the penalty may be respectively set in the recovery/penalty information. By doing so, the recovery process may be performed when the event as the detection object for the recovery is detected, and the penalty process may be performed when the event as the detection object for the penalty is detected.

As explained so far, when the predetermined event occurs, the warning is issued to the user and the judgment as to whether to perform a recovery or impose a penalty is made in the terminal device 300 at first. Then, when the predetermined threshold is exceeded, the terminal device 300 requests the server to make the judgment as to whether to perform the recovery or impose the penalty. Accordingly, the usage by a malicious user can be cancelled.

This can prevent the predetermined event that is caused unintentionally by an unmalicious user, and allows for the recovery or the penalty reflecting the policy of the content provider which runs the server while reducing the communication process.

Moreover, in the above description, the judgment made in the recovery/penalty judgment process is based on the number of recoveries D1002 included in the recovery/penalty history. However, the judgment may be made based on the number of occurrences of the predetermined event or on the number of penalties. In the case where a plurality of events are set as detection objects and the recovery/penalty judgment is made on the basis of the number of occurrences of a corresponding predetermined event, a threshold value can be set for each event. As a result, more flexible recovery/penalty control is allowed. In the case where the recovery/penalty judgment is made on the basis of the number of penalties, a penalty detail can be changed in accordance with the number of penalties. As a result, more flexible recovery/penalty control is allowed. To be more specific, it becomes possible to control in such a way that "the usage of the current license is cancelled" when the number of penalties is three times or less and that "the usage of the present terminal is cancelled" when the number of penalties exceeds three times.

Furthermore, in the case of the recovery process or the occurrence of the predetermined event, a judgment may be made as to whether or not the number of recoveries or the number of occurrences is updated.

Here, an explanation is given for a reason why the number of recoveries or the number of occurrences of the predetermined event is counted.

By counting an act which is considered fraud maliciously committed by a user, the number of recoveries or the number of occurrences is used for judging that the user has committed the fraud when the act is repeated more than a predetermined number of times.

Conversely, when the recovery process or the predetermined event takes place in circumstances in which the user has no ill will, that is, when it is against the intention of the user, such process or event does not need to be counted.

Here, an explanation is given about classification of the usage rule included in the license. The usage rule can be classified into two groups: a stateless usage rule having no state; and a stateful usage rule having a state. The stateless usage rule does not need to be updated whereas the stateful usage rule needs to be updated. To be more specific, the former is a usage rule including only the valid period, and the latter is a usage rule including the remaining number of reproduction times, such as "five times", and the remaining valid period, for example.

A power down that occurs while the license having the stateful usage rule is being used may be fraud that intentionally prevents the usage rule from being reduced, although it needs to be reduced in a normal situation. On the other hand, a power down that occurs while the license having the stateless usage rule is being used is judged to have less possibility of fraud since there is no advantage to the user. With this being the situation, in the case of the stateless usage rule, the license may not be locked and the number of the recoveries or the number of occurrences of the predetermined event may not be counted up. On the other hand, in the case of the stateful usage rule, the license may be locked and the number of the recoveries or the number of occurrences of the predetermined event may be counted up.

Moreover, a flag showing as to whether or not the count-up is needed may be set in the license so that the judgment as to whether or not the count-up is necessary can be made. For example, in the case of a free-of-charge license, a flag showing that the count-up is unnecessary may be set since there is less possibility of fraud.

INDUSTRIAL APPLICABILITY

The contents using device according to the present invention can be applied to a content distribution service receiving terminal that uses a package medium such as a DVD, and to a content distribution service receiving terminal that uses digital broadcasting, CATV, and the Internet.

The invention claimed is:

1. A contents using device which uses a content with a license including a usage rule, said contents using device comprising:
   a license processing unit operable to judge, on the basis of the usage rule of the license, whether or not the content is available;
   a content using unit operable to use the content judged by said license processing unit to be available;
   a restriction unit operable to restrict a usage of the license corresponding to the content used by said content using unit;
   an event detection unit operable to detect a predetermined event that occurs between a start and a normal end of the content usage and that forcefully aborts the content usage;
   a restriction-relaxation necessity judgment unit operable to judge whether or not to relax a restriction on the license usage;
   a restriction relaxation unit operable to relax the restriction on the license usage when said restriction-relaxation necessity judgment unit judges that the restriction is to be relaxed; and
   a number-of-event-occurrences storage unit operable to store the number of occurrences of the predetermined event detected by said event detection unit,
   wherein said restriction-relaxation necessity judgment unit is operable to judge whether or not to relax the restriction, on the basis of the number of the event occurrences stored in said number-of-event-occurrences storage unit.

2. The contents using device according to claim 1,
   wherein said restriction unit is operable to restrict the license usage by subtracting a predetermined number of times from the number of usage times included in the usage rule of the license corresponding to the content.

3. The contents using device according to claim 2,
   wherein said restriction unit is operable to judge whether or not to restrict the license usage, on the basis as to whether the usage rule of the license is a stateless usage rule that does not need to be updated or a stateful usage rule that needs to be updated.

4. The contents using device according to claim 2,
   wherein information which is necessary for the judgment as to whether or not to relax the restriction on the license usage is not counted up when the usage rule of the license is the stateless usage rule, whereas the information is counted up when the usage rule of the license is the stateful usage rule.

5. The contents using device according to claim 2,
wherein said restriction relaxation unit is operable to relax the restriction imposed on the license usage by said restriction unit, by adding a predetermined number of times.

6. The contents using device according to claim 5,
wherein said license processing unit is further operable to subtract an amount of usage from the usage rule of the license corresponding to the content, during or after a time period between the start and the end of the content usage by said content using unit,
when said license processing unit has performed the subtraction on the usage rule of the license before an occurrence of the predetermined event, said restriction relaxation unit is operable to recover the usage rule to a state where the content usage has yet to be started or to recover the usage rule by subtracting a predetermined amount from the state where the content usage has yet to be started.

7. The contents using device according to claim 2,
wherein the predetermined event is one of a power down during the content usage and a removal of an IC card managing the license from said device during the content usage.

8. The contents using device according to claim 7,
wherein said event detection unit is operable to detect the predetermined event using one of: a power management unit operable to detect the power down occurring during the content usage; a card insertion/removal management unit operable to detect the removal of the IC card managing the license from said device during the content usage; and a usage start log of said content using unit.

9. The contents using device according to claim 2, said contents using device further comprising
a warning notification unit operable to notify the user of a warning detail when said event detection unit detects the predetermined event.

10. The contents using device according to claim 2, said contents using device further comprising
a restriction-relaxation information storage unit operable to store information regarding a restriction relaxation,
wherein said restriction relaxation unit is operable to relax the restriction on the license usage on the basis of the information regarding the restriction relaxation that is stored in said restriction-relaxation information storage unit.

11. The contents using device according to claim 2, said contents using device further comprising
a number-of-occurrences update judgment unit operable to judge whether or not to update the number of event occurrences stored in said number-of-event-occurrences storage unit.

12. The contents using device according to claim 2,
wherein said restriction-relaxation necessity judgment unit is operable to judge that the restriction is to be relaxed when the number of the event occurrences stored in said number-of-event-occurrences storage unit is equal to or below a predetermined threshold value.

13. The contents using device according to claim 2, said contents using device further comprising
a restriction-relaxation history storage unit operable to store a history of restriction relaxations performed by said restriction relaxation unit,
wherein said restriction-relaxation necessity judgment unit is operable to judge whether or not to relax the restriction, on the basis of the history of restriction relaxations stored in said restriction-relaxation history storage unit.

14. The contents using device according to claim 13, said contents using device further comprising
a restriction-relaxation history update judgment unit operable to judge whether or not to update the history of restriction relaxations stored in the restriction-relaxation history storage unit.

15. The contents using device according to claim 2, said contents using device further comprising
a restriction tightening unit operable to tighten the restriction on the license usage when said restriction-relaxation necessity judgment unit judges not to relax the restriction.

16. The contents using device according to claim 15, said contents using device further comprising
a restriction tightening information storage unit operable to store information regarding a restriction tightening,
wherein said restriction tightening unit is operable to tighten the restriction on the license usage on the basis of the information regarding the restriction tightening that is stored in said restriction tightening information storage unit.

17. The contents using device according to claim 15,
wherein said restriction tightening unit is operable to tighten the restriction on the license usage by deleting the license from which the predetermined number of times has been subtracted by said restriction unit.

18. The contents using device according to claim 15,
wherein said restriction tightening unit is operable to tighten the restriction on the license usage by stopping an operation of said contents using device.

19. The contents using device according to claim 1,
wherein said restriction unit is operable to restrict the license usage by locking the license corresponding to the content for a time period between the start and the normal end of the content usage by said content using unit in order to prevent the license from being used by another source by reason that the license is currently in use.

20. The contents using device according to claim 19,
wherein said restriction relaxation unit is operable to relax the restriction on the license usage by unlocking the license, which has been locked by said restriction unit, in order to make the license available to the other source by reason that the license is not currently in use.

21. The contents using device according to claim 20,
wherein said license processing unit is further operable to subtract an amount of usage from the usage rule corresponding to the content, during or after the time period between the start and the end of the content usage by said content using unit,
when said license processing unit has performed the subtraction on the usage rule of the license before an occurrence of the predetermined event, said restriction relaxation unit is operable to recover the usage rule to a state where the content usage has yet to be started or to recover the usage rule by subtracting a predetermined amount from the state where the content usage has yet to be started.

22. The contents using device according to claim 19, said contents using device further comprising
a restriction-relaxation information storage unit operable to store information regarding a restriction relaxation,
wherein said restriction relaxation unit is operable to relax the restriction on the license usage on the basis of the information regarding the restriction relaxation that is stored in said restriction-relaxation information storage unit.

23. The contents using device according to claim 19, said contents using device further comprising
a number-of-occurrences update judgment unit operable to judge whether or not to update the number of event occurrences stored in said number-of-event-occurrences storage unit.

24. The contents using device according to claim 19, wherein said restriction-relaxation necessity judgment unit is operable to judge that the restriction is to be relaxed when the number of the event occurrences stored in said number-of-event-occurrences storage unit is equal to or below a predetermined threshold value.

25. The contents using device according to claim 19, said contents using device further comprising
a restriction-relaxation history storage unit operable to store a history of restriction relaxations performed by said restriction relaxation unit,
wherein said restriction-relaxation necessity judgment unit is operable to judge whether or not to relax the restriction, on the basis of the history of restriction relaxations stored in said restriction-relaxation history storage unit.

26. The contents using device according to claim 25, said contents using device further comprising
a restriction-relaxation history update judgment unit operable to judge whether or not to update the history of restriction relaxations stored in the restriction-relaxation history storage unit.

27. The contents using device according to claim 19, said contents using device further comprising
a restriction tightening unit operable to tighten the restriction on the license usage when said restriction-relaxation necessity judgment unit judges not to relax the restriction.

28. The contents using device according to claim 27, wherein said restriction tightening unit is operable to tighten the restriction on the license usage by unlocking the license having been locked by said restriction unit and by subtracting a predetermined amount from the usage rule of the license in a state where a reproduction has yet to be started.

29. A contents using method for using a content with a license including a usage rule, said contents using method comprising:
a license processing step of judging, on the basis of the usage rule of the license, whether or not the content is available;
a content using step of using the content judged in said license processing step to be available;
a restriction step of restricting a usage of the license corresponding to the content used in said content using step;
an event detection step of detecting a predetermined event that occurs between a start and a normal end of the content usage and that forcefully aborts the content usage;
a restriction-relaxation necessity judgment step of judging whether or not to relax a restriction on the license usage;
a restriction relaxation step of relaxing the restriction on the license usage when the restriction is judged to be relaxed in said restriction-relaxation necessity judgment step; and
a number-of-event-occurrences storage step of storing the number of occurrences of the predetermined event detected in said event detection step,
wherein whether or not to relax the restriction is judged in said restriction-relaxation necessity judgment step on the basis of the number of the event occurrences stored in said number-of-event-occurrences storage step.

30. A program that causes a computer to execute the steps included in the contents using method according to claim 29.

* * * * *